(12) United States Patent
Heissenbuttel et al.

(10) Patent No.: US 6,993,503 B1
(45) Date of Patent: Jan. 31, 2006

(54) SYSTEM AND METHOD FOR ALLOCATING A CONDITIONAL PURCHASE OFFER FOR A TRAVEL RELATED SERVICES RESERVATION TO ONE OF A PLURALITY OF ENTITIES IN A BUYER DRIVEN ELECTRONIC COMMERCE SYSTEM

(75) Inventors: Peter James Heissenbuttel, Ridgefield, CT (US); William Morrison Homes, Darien, CT (US); Sarah Dodge Johnson, Stamford, CT (US); Thomas M. Sparico, Stamford, CT (US); Robert S. Wisse, Fairfield, CT (US)

(73) Assignee: priceline.com Incorporated, Norwalk, CT (US)

( * ) Notice: Subject to any disclaimer, the term of this patent is extended or adjusted under 35 U.S.C. 154(b) by 0 days.

(21) Appl. No.: 09/560,091

(22) Filed: Apr. 28, 2000

Related U.S. Application Data

(60) Provisional application No. 60/179,008, filed on Jan. 28, 2000.

(51) Int. Cl.
*G06F 17/60* (2006.01)

(52) U.S. Cl. .............................. 705/37; 705/10; 705/26; 705/28; 705/35

(58) Field of Classification Search ................. 705/37, 705/80, 5, 6, 10, 20, 26, 35, 28, 418, 500, 705/1; 709/223, 224, 229
See application file for complete search history.

(56) References Cited

U.S. PATENT DOCUMENTS

| | | | |
|---|---|---|---|
| 3,573,747 A | 4/1971 | Adams et al. | |
| 3,581,072 A | 5/1971 | Nymeyer | |
| 4,247,759 A | 1/1981 | Yuris et al. | |
| 4,449,186 A | 5/1984 | Kelly et al. | |
| 4,553,222 A | 11/1985 | Kurland et al. | |
| 4,677,552 A | 6/1987 | Sibley, Jr. | |
| 4,751,728 A | 6/1988 | Treat | |
| 4,789,928 A | 12/1988 | Fujisaki | |
| 4,799,156 A | 1/1989 | Shavit et al. | |
| 4,903,201 A | 2/1990 | Wagner | |

(Continued)

FOREIGN PATENT DOCUMENTS

EP 0900424 * 10/2001

(Continued)

OTHER PUBLICATIONS

Wolverton, Troy; Cnet News.com Tech News First; "Expedia to customers: name your hotel room price", Sep. 7, 1999; http://news.com/ Expedia+to+customers+name+your+hotel+room+price/2100-1017_3-201113.h. . . ; pp. 1-3.*

(Continued)

*Primary Examiner*—Ella Colbert
(74) *Attorney, Agent, or Firm*—Chadbourne & Parks LLP

(57) ABSTRACT

A system and method of allocating a conditional purchase offer for a product or service to one of a plurality of entities in a buyer-driven system. The conditional purchase offer for the product or service in a specified relevant market area is received and at least one of the plurality of entities capable of satisfying the conditional purchase offer are identified. A first-look opportunity to accept the conditional purchase offer is allocated to one of the identified entities and, if it is determined that that entity cannot accept the conditional purchase offer, then a second-look opportunity to accept the conditional purchase offer is provided to one of the remaining entities. The opportunity to accept the offer is provided to each entity according to the allocation until an entity accepts the conditional purchase offer or no eligible entities remain.

78 Claims, 10 Drawing Sheets

U.S. PATENT DOCUMENTS

| | | |
|---|---|---|
| 4,931,932 A | 6/1990 | Dalnekoff et al. |
| 5,021,953 A | 6/1991 | Webber et al. |
| 5,136,501 A | 8/1992 | Silverman et al. |
| 5,168,446 A | 12/1992 | Wiseman |
| 5,191,523 A | 3/1993 | Whitesage |
| 5,191,613 A | 3/1993 | Graziano et al. |
| 5,224,034 A | 6/1993 | Katz et al. |
| 5,243,515 A | 9/1993 | Lee |
| 5,253,165 A | 10/1993 | Leiseca et al. |
| 5,262,941 A | 11/1993 | Saladin et al. |
| 5,283,731 A | 2/1994 | Lalonde et al. |
| 5,297,031 A | 3/1994 | Gutterman et al. |
| 5,329,589 A | 7/1994 | Fraser et al. |
| 5,331,546 A | 7/1994 | Webber et al. |
| 5,361,199 A | 11/1994 | Shoquist et al. |
| 5,404,291 A | 4/1995 | Kerr et al. |
| 5,420,914 A | 5/1995 | Blumhardt |
| 5,426,281 A | 6/1995 | Abecassis |
| 5,444,630 A | 8/1995 | Dlugos |
| 5,467,269 A | 11/1995 | Flaten |
| 5,500,793 A | 3/1996 | Deming, Jr. et al. |
| 5,517,555 A | 5/1996 | Amadon et al. |
| 5,519,769 A | 5/1996 | Weinberger et al. |
| 5,553,131 A | 9/1996 | Minervino, Jr. et al. |
| 5,557,517 A | 9/1996 | Daughterty, III |
| 5,557,518 A | 9/1996 | Rosen |
| 5,570,283 A | 10/1996 | Shoolery et al. |
| 5,592,375 A | 1/1997 | Salmon et al. |
| 5,606,602 A | 2/1997 | Johnson et al. |
| 5,611,052 A | 3/1997 | Dykstra et al. |
| 5,615,269 A | 3/1997 | Micali |
| 5,664,115 A | 9/1997 | Fraser |
| 5,689,652 A | 11/1997 | Lupien et al. |
| 5,694,551 A | 12/1997 | Doyle et al. |
| 5,696,965 A | 12/1997 | Dedrick |
| 5,715,402 A | 2/1998 | Popolo |
| 5,717,989 A | 2/1998 | Tozzoli et al. |
| 5,732,400 A | 3/1998 | Mandler et al. |
| 5,745,882 A | 4/1998 | Bixler et al. |
| 5,757,917 A | 5/1998 | Rose et al. |
| 5,758,328 A | 5/1998 | Giovannoli |
| 5,774,883 A | 6/1998 | Andersen et al. |
| 5,794,207 A | 8/1998 | Walker et al. |
| 5,794,219 A | 8/1998 | Brown |
| 5,797,127 A | 8/1998 | Walker et al. |
| 5,799,285 A | 8/1998 | Klingman |
| 5,809,478 A | 9/1998 | Greco et al. |
| 5,826,244 A | 10/1998 | Huberman |
| 5,832,452 A | 11/1998 | Schneider et al. |
| 5,835,896 A | 11/1998 | Fisher et al. |
| 5,845,265 A | 12/1998 | Woolston |
| 5,878,403 A | 3/1999 | DeFrancesco et al. |
| 5,893,076 A * | 4/1999 | Hafner et al. ............... 705/28 |
| 5,897,620 A * | 4/1999 | Walker et al. ............... 705/5 |
| 5,963,923 A * | 10/1999 | Garber ............... 705/37 |
| 6,041,308 A * | 3/2000 | Walker et al. ............... 705/14 |
| 6,085,169 A * | 7/2000 | Walker et al. ............... 705/26 |
| 6,108,639 A * | 8/2000 | Walker et al. ............... 705/26 |
| 6,134,534 A * | 10/2000 | Walker et al. ............... 705/26 |
| 6,141,653 A * | 10/2000 | Conklin et al. ............... 705/80 |
| 6,240,396 B1 * | 5/2001 | Walker et al. ............... 705/26 |
| 6,260,024 B1 * | 7/2001 | Shkedy ............... 705/37 |
| 6,332,129 B1 * | 12/2001 | Walker et al. ............... 705/26 |
| 6,345,090 B1 * | 2/2002 | Walker et al. ............... 379/114.1 |
| 6,356,878 B1 * | 3/2002 | Walker et al. ............... 705/26 |
| 6,418,415 B1 * | 7/2002 | Walker et al. ............... 705/26 |
| 6,466,919 B1 * | 10/2002 | Walker et al. ............... 705/37 |
| 6,484,153 B1 * | 11/2002 | Walker et al. ............... 705/38 |
| 6,553,346 B1 * | 4/2003 | Walker et al. ............... 705/1 |
| 6,598,026 B1 * | 7/2003 | Ojha et al. ............... 705/26 |
| 2002/0161610 A1 * | 10/2002 | Walker et al. ............... 705/5 |
| 2002/0178069 A1 * | 11/2002 | Walker et al. ............... 705/26 |

FOREIGN PATENT DOCUMENTS

| | | | |
|---|---|---|---|
| WO | | 96/34356 | 10/1996 |
| WO | | 97/46961 | 12/1997 |
| WO | WO | 99/23595 | * 5/1999 |
| WO | WO | 00/34841 | * 6/2000 |
| WO | WO | 00/34886 | * 6/2000 |
| WO | WO | 01/18724 | * 3/2001 |

OTHER PUBLICATIONS

About IAO, selected pages downloaded from www.iaoauction.com on Sep. 8, 1997 and Sep. 18, 1997.

Airhitch: Your Way to Low Cost Travel, selected pages downloaded from www.vaportrails.com on May 6, 1997.

American Airlines Internet Silent Auction, selected pages downloaded form www.americanair.com (date unknown).

Apollo Host Computer, selected pages downloaded from www.apollo.com(date unknown).

Cathay Pacific: CyberTraveler Auction #3—Official Rules, selected pages downloaded from www.cathaypacific.com, Jul. 30, 1996.

Cathay Pacific Online Ticket Bidding, World Internet News Digest, May 8, 1996.

Classifieds2000: The Internet Classified, selected pages downloaded from www.classifieds2000.com on Aug. 6, 1997.

CREST: Cruise/Ferry Revenue Management System, selected pages downloaded from www.rtscorp.com on Aug. 5, 1996.

CyberBid, Net Fun Ltd. (1996).

Laura Del Rosso, *Marketel Says It Plans to Launch Air Fare 'Auction' in June: Marketel International, Inc.*, Travel Weekly, Apr. 29, 1991, at 1.

Laura Del Rosso, *Ticket—Bidding Firm Closes its Doors: Marketel International, Inc.*, Travel Weekly, Mar. 12, 1992, at 1.

Frequently Asked Questions About: Airhitch, selected pages downloaded from www.isicom.com.fr/airhitch on May 6, 1997.

Fran Golden, *AAL's Riga Doubts Marketel's Appeal to Retailers; Chris Riga of American Airlines*, Travel Weekly, Nov. 13, 1989, at 4.

Hitch a Flight to Europe, selected pages downloaded from www.travelassist.com on May 6, 1997.

Robert Kuttner, *Computer May Turn the World Into One Big Commodities Pit*, Business Week, Sep. 11, 1989, at 17.

NASDAQ Consolidated Subscriber Agreement, downloaded from www.pcquote.com/exchanges on Aug. 15, 1997.

NASDAQ: What Is NASDAQ?, selected pages downloaded from http://home.axford.com on Aug. 15, 1997.

Lisa Nishimoto, Travel Services Are First Online Commerce Offerings to Fly, Inforworld, Jul. 29, 1996, downloaded from http://www.infoworld.com.

Onsale: Auction Supersite, selected pages downloaded from www.onsale.com on Sep. 8, 1997.

Jeff Pelline, *Travel Bidding on Airline Tickets: SF Firm Offers Chance for Cut Rate Fares*, The San Franciso Chronicle, Aug. 19, 1991, (News) at A4.

Saber Decision Technologies, selected pages downloaded from www.saber.com (date unknown).

J. Kelsey and B. Schneier, Conditional Purchase Orders, 4th ACM Conference on Computer and Communications Security, ACM Press, 117-124 (Apr. 1997).

Michael Schrage, *An Experiment In Economic Theory*; Labs Testing Real Markets, The Record, Nov. 26, 1989, (Business) at B01.

The United Computer Exchange: How It All Works, selected pages downloaded from www.uce.com on Jul. 23, 1997.

Trading Floor: General Trading Information and Terms, dowmloaded from www.tradingfloor.com on Aug. 14, 1997.

*World's First Real-Time Travel Auction Service to Be Available Via World Wide Web*: ETA To Open Bidding To Consumers, Business Wire, DIALOG Trade & Industry Database (Nov. 4, 1996).

Richard Carroll, *Hitch a Flight to Europe*, p. 1, <http//travelassist.com/mag/a69.html>. Undated.

*Airhitch Your Way To Low Cost Travel*, pp. 1, 2, <http://www.vaportrails.com/Budget/BudFeatures/Airhitch/Airhitch.html>. Undated.

Sue Goldstein, Airhitch, p. 1. Undated.

Miles Poindexter, *Airhitch: Myth or Fact*, pp. 1, 2. Undated.

*Frequently Asked Questions about Airhitch*, pp. 1-5, 1995, <http://www.isicom.fr/airhitch/ahfaq>.

*Across the Atlantic Anytime for $169!!!*, pp. 1, 2, <http://www.isicom.fr/airhitch/index.html>. Undated.

*Airhitch, General Information, New!!! Target Flights Update*, pp. 1-6, <http://www.isicom.fr/airhitch/info.htm>. Undated.

*Target Flight(R) Quote Request Form*, pp. 1, 2, <http://www.isicom.fr/airhitch/tf_qrf.txt>. Undated.

*Working For/With Airhitch*, pp. 1-5, <http:www.isicom.fr/airhitch/jobs.htm>. Undated.

*Marketel says it plans to launch air fare "auction" in June: Marketel Int'l Inc.*, Travel Weekly, vol. 50, No. 34, p. 1, Apr. 29, 1991.

*Ticketing Revolution Could Triple Airlines Profits, Analyst Says*, Aviation Daily, vol. 325, No. 11, p. 87, Jul. 17, 1996.

*Cathay Pacific to Auction Off Airline Tickets on the Internet*, The San Francisco Chronicle, Business, p. C4, Apr. 30, 1996.

*Going Once, Going Twice, Going Online*, The San Francisco Chronicle, Business, p. B1, Nov. 13, 1995.

*Auctioning Unsold Airline Tickets*, <http://www.newciv.org/GIB/BOV/BV-409.HTML>. Undated.

*Ticket-Bidding Firm Closes Its Doors; Marketel Int'l*, Travel Weekly, vol. 51, No. 21, p. 1, Mar. 12, 1992,

*Travelers Bidding On Airline Tickets—SF Firm Offers Chance for Cut-Rate Fares*, The San Francisco Chronicle, News, p. A4, Aug. 19, 1991.

*An Experiment In Economic Theory; Labs Testing Real Markets*, The Record, Business, p. B01, Nov. 26, 1989.

*AAL's Riga Doubts Marketel's Appeal to Retailers; Chris Riga of American Airlines*, Travel Weekly, vol. 48, No. 91, p. 4, Nov. 13, 1989.

*Computers May Turn the World Into One Big Commodities Pit*, Business Week, Economic ViewPoint, No. 3123, p. 17, Sep. 11, 1989.

*Northeastern International Airways Offers at $79 One-way Low Fare Between Florida and New York*; PR Newswire, FLPR3; Sep. 11, 1984; DIALOG: File 148, Acc# 02199728.

Green; *Student Standby Fares Now a Flight of Fancy*; Chicago Tribune, Nov. 20, 1985; DIALOG: File 632, Acc# 01076578.

Shea; *Despite Hitches, Airhitch Offers Rock-bottom Flights*; San Jose Mercury News; Mar. 22, 1992; DIALOG: File 634, Acc# 06582190.

Miskin; *On the Go*; Newsday; Jul. 10, 1994; DIALOG: File 638, Acc# 07691008.

Fishkin, Ken, Foresight Exchange Tutorial: (http://www.ideosphere.com/fx/docs/tutorial.html) Feb. 19, 1999 at pge. 1-5.

"Bid.com 1998 Third-Quarter Revenue Increases 12.5 Percent From Second Quarter", Business Wire, Oct. 29, 1998.

Final Report: Virtual Hospital (http://www.telemed.medadmin.uiowa.edu/TRCDocs/Pubs/FinalReport/cVirtualH/virtualH/virtualh02.html), download date: Sep. 20, 1998.

"First Source Become a Member", More Reasons To Join First Source! (http://www.fsource.com/bene.html), download date: Sep. 20, 1998.

Jeffrey Davis, "Big Storm rising", Business 2.0, Sep., 1998 at p. 60.

Suite 101.com (http://www.suite101.com/doc.cfm.presskit/questions), 1998.

Web Marketing Today (http://www.wilsonweb.com/rfwilson/wmt2/issue36htm) dated Sep. 1, 1997, download date: Sep. 17, 1998.

"Free Stuff Internet Site Delivers for Viewers and Advertisers Alike", Press Release of PromoNet Interactive, Inc. dated Nov. 10, 1997.

About Iao, selected pages downloaded from www.iaoauction.com on Sep. 8, 1997 and Sep. 18, 1997.

Hapgood, Fred bidder Harvest, Sep. 1997, pge 58.

TradingFloor: General Trading Information and Terms, downloaded from www.tradingfloor.com on Aug. 14, 1997.

HomeShark: Refinance Check, selected pages downloaded from www.homeshark.com on Aug. 13, 1997.

The Loan Process, downloaded form www.sdtech.com/mls/process on Aug. 7, 1997.

Trade-Direct: We Help You Trade With Confidence, selected pages downloaded from www.trade-direct.com on Aug. 6, 1997.

Classifieds2000: The Internet Classifieds, selected pages downloaded from www.classifieds2000.com on Aug. 6, 1997.

Internet Mortgage Service Eliminates Loan Agents and Passes Commissions on to the Consumer, Company Press Release, Yahoo Business Wire (Jun. 30, 1997).

Airhitch: Your Way to Low Cost Travel, selected pages downloaded from www.vaportrails.com on May 6, 1997.

Kelsey, J. and Schneier, B., Conditional Purchase Orders, 4th ACM Conference on Computer and Communications Security, ACM Press, 117-124 (Apr. 1997).

Bryant, Adam, "Shaking Up Air Fares Status Quo", The New York Times, Mar. 31, 1997.

Silverman, Robert, "GM Drives Wed Ad Insertion Network", Inside Media, Feb. 26, 1997, vol. 9, No. 1, pge 1; ISSN:1046-5316.

"Flycast Introduces Unique 'Open Exchange' Match-Making Service", Interactive Marketing News, Feb. 21, 1997, vol. 4, No. 8.

"UK's World Telecom Unveils New WorldSaver Tariffs," Newsbytes, Information Access Company (Feb. 13, 1997).

"TransQuest and Web Ventures Deliver Internet Booking for Delta Air Lines", PR Newswire, Dec. 10, 1996, Financial News Section.

"Affinicast Enables Web Sites That Listen and Adapt to Customer Affinities", PR Newswire, Dec. 3, 1996.

"Web Ventures Presents BookIt!" press release printed from http://www/webventures.com/bookit/(Web Ventures World Wide Web site) on Dec. 2, 1996.

"World's First Real-Time Travel Auction Service to Be Available Via World Wide Web: ETA To Open Biding to Consumers," Business Wire, DIALOG Trade & Industry Database (Nov. 4, 1996).

Gessel, Chris, "Trade Smarter: The Limit of Orders", Investor's Business Daily, Oct. 14, 1996, p. A1.

Nishimoto, Lisa, "Travel Services Are First Online Commerce Offerings to Fly," Infoworld, Jul. 29, 1996, downloaded from http://www.infoworld.com.

About Rate Hunter, dowloaded from http://207.49.64.77/rhprodrh.htm on Jul. 14, 1996.

Cathay Pacific Online Ticket Bidding, World Internet News Digest (May 8, 1996).

Sothbey's General Information, downloaded from www.sothebys.com (1996).

CyberBid, Net Fun Ltd.(1996).

Nimmer, Raymond, T., "Electronic Contracting; Legal Issues", 14 J. Marshall J.Computer & Info L.211, Winter, 1996.

American Law Institute, Draft-Uniform Commercial Code Revised Article 2 (Sales), parts 2, 3, and 7, pp. 1-15, Jan. 4, 1996.

Speidel, Richard E. & Schott, Lee A., "Impact of Electronic Contracting on Contract Formation Under Revised UCC Article 2, Sales",C878 ALI-ABA 335, Dec. 9, 1993.

Hainer, Cathy and Grossman,Cathy Lynn, "Where Vacationing Kids Get Good Care", USA Today, Apr. 1, 1992, at p. 4D.

Del Russo, Laura, "Ticket-Bidding Firm Closes Its Door," Travel Weekly, Mar. 12, 1992.

"Newsletters", The Atlanta Constitution, Mar. 1, 1992, pge. K13.

"CRTL's Blue Ribbon Deals for 1992", Consumer Reports Travel Letter, Jan. 1992, vol. 8, No. 1, at pp. 3-5.

Traveler's Notes; Bookit Report, Consumer Reports Travel Letter, Dec. 1991 at pge. 143.

Feldman, Joan M., "To Rein In Those CRSs; Computer Reservation Systems", Air Transport World, Dec. 1991, at pge 89.

"MONEY BRIEFS; Buy Low, Fly High", Gannet News Service, Nov. 20, 1991.

"Buy Low, Fly High", USA Today, Nov. 14, 1991 at pge. 15.

Traveler's Notes; Easier Airfare Bidding, Consumer Reports Travel Letter, Oct. 1991 at pge 119.

Nelson, Janet "Practical Traveler; Airlines Relaxing Policy on No-Refund Tickets", The New York Times, Sep. 22, 1991 at pge. 3 of Section 5.

Pelline, Jeff, "New Service; Now You Can Make a Bid on Your Next Airline Ticket Home", The Orange County Register, Sep. 1, 1991 at pge. E01.

"Bookit Airfare Bidding System (Fax for Your Plane Ticket?)", Consumer Reports Travel Letter, Sep. 1991, pges. 97 & 106.

Upton, Kim "French Say Monoliths Off-limits to Visitors", Los Angeles Times, Aug. 25, 1991.

Pelline, Jeff, "Travelers Bidding on Airline Tickets; SF Firm Offers Chance for Cut-Rate Fares", San Francisco Chronicle, Section 4A, Aug. 19, 1991.

Carey, Christopher, "Firm Offers Auction For Airline Tickets", St. Louis Post-Dispatch, Aug. 7, 1991 at pge 1B.

Del Rosso, Laura, "Marketel Says It Plans to Launch Air Fare 'Auction' in June", Travel Weekly, Apr. 29, 1991.

NASDAQ Adds Enhancements to SOES Limit Order File, Securities Week, Nov. 26, 1990, pge. 5.

Ritter, Jeffrey B., "Scope of the Uniform Commercial Code: Computer Contracting Cases and Electrical Commercial Practices", 45 Bus. Law 2533, Aug., 1990.

Greenburg, Peter, S., "Judging DeRegulation", The Record, Jul. 22, 1990 at p. T01.

Greenburg, Peter, S., "The Savvy Traveler: Lower Air Fares for Consumers Not in the Cards; Airlines: Remember When It Cost $16 to fly From Los Angeles to San Francisco? Then You Remember the Days Before DeRegulation. Since Then, Prices Have Soared", Los Angeles Times, Jul. 8, 1990 at p. L2.

Wallace, David, "Company Planning to Let Fliers Bid on Airfares", Philadelphia Business Journal, Mar. 26, 1990 at pge 15.

Koepper, Ken, "Room Inventory Auctioning: The Next CRS Generation", Lodging, Jan. 1990 at p. 26, 29-30.

"Letter to Business Extra", The San Francisco Chronicle, Dec. 26, 1989 at pge C7.

Schrage, Michael, "An Experiment in Economic Theory; Labs Testing Real Markets", The Record Section B1, Nov. 26, 1989.

Schrage, Michael Innovation/Michael Schrage: Laboratory Experiments with Market Economics, Los Angeles Times, Nov. 23, 1989 at pge. D1.

Golden, Fran "AAL's Riga Doubts Marketel's Appeal to Retailers", Travel Weekly, Nov. 13, 1989.

Del Rosso, Laura, Firm Proposes ticket-bidding system; Marketel explores electronic auction of travel; Marketel International., Travel Weekly, Section No. 91, vol. 48, p. 1; Nov. 13, 1989.

Carlsen, Clifford, "Polaris Group Set to Fly the Leveraged Sky", San Francisco Business Times, Nov. 6, 1989 at pge. 1.

Kuttner, Robert, "Computer May Turn the World into One Big Commodities Pit", Business Week, Sep. 11, 1989.

Carlsen, Clifford, "From Airline Tickets to Human Organs, the Electronics Markets Are Booming", San Francisco Business Times, Aug. 14, 1989 at pge. 17.

"Public May Submit Bids To Get Bargain Rates", Wall Street Journal, Section 2; p. 1, Column 1; Aug. 1, 1989.

American Airlines Internet Silent Auction, selected pages downloaded from www.americanair.com.

Apollo Host Computer, selected pages downloaded from www.appollo.com.

"Auctioning unsold airline tickets." (http://www.newciv.org/GIB/BOV/BV-409.HTMl), at pge 1.

Cathay Pacific:CyberTraveler Auction #3—Official Rules, selected pages downloaded from www.cathaypacific.com.

CSM Online: About Collector's Super Mall downloaded from www.csmonline.com.

Sabre Decision Technologies, selected pages downloaded from www.sabre.com.

PhoneMiser: Frequently Asked Questions, downloaded from www.phonemiser.com.

The United Computer Exchange: How It All Works, selected pages downloaded from www.uce.com.

Tired of Shopping For the Best Home Loan?, Mortgage Loan Specialists.

LANCORP Mortgage Services, http://www.lancorp-mortgage.com/retailpa.htm, 1998.

Inland Mortgage Corporation, http://inlandmortgage.com/index.htm, 1998.

The Mortgage Store, http://www.mortgagestore.com, 1998.

Golden Age Antiques and Collectibles Online Auction, http://www.goldage.com, 1997.

Moran, Susan, "Xerox Won't Duplicate Past Errors", Business Week, Sep. 29, 1997.
Coleman, Zach, "Electronic Trading System Matches Buyers, Seller", Atlanta Business Chronicle, vol. 20; No. 12; p. 37A, Aug. 22, 1997.
"What's Holding Up E-Cash?", Cybernautics Digest, vol. 3; No. 7, Finance.
Resnick, Paul et al, "Roles For Electronic Brokers", http://ccs.mit.edu/CCSWPI79.htm 1997.
Philatelists Online Information, http://www506.bonsai.com/q/@131354lhyljf/infop.html, 1997.
Sports trade Information, http://www.sportstrade.com/infos.html, 1997.
Numismatists Online Information, http://www.numismatists.com/info.html, 1997.
Sell and Trade Internet Marketplace, Sell and Trade, http://sellandtrade.com/script/main.asp, 1997.
Kay, Alan, "Chapter 7 Future Research", 1997.
Trade-direct, http://www.trade-direct.com. 1997.
"Internet Mortgage Service Eliminates Loan Agents and Passes Commissions on to the Consumer", Yahoo! Finance, 1997.
Negroponte, Nicholas, "Pay Whom Per What When, Part 2", NEGROPONTE, Issue 5.03, 1997.
"Ticketing revolution Could Triple Airline Profits, Analyst Says", Aviation Daily, vol. 325; No. 11; p. 87, 1996.
"Auctioning Unsold Airline Tickets", adapted extract from Insight (USA), The Global Ideas Bank, 1996.
Rockoff, Todd E., et al., "Design of an Internet-based system for remote Dutch auctions," Internet Research: Electronic Networking Applications and Policy, vol. 5, No. 4, pp. 10-16, 1995.
Franklin, Matthew K., et al., "The Design and Implementation of a Secure Auction Service," Proceedings: 1995 IEEE Symposium on Security and Privacy, pp. 2-14, 1995.
Tenenbaum, Jay M., et al., "CommerceNet: Spontaneous Electronic Commerce on the Internet," 1995 IEEE Spring Conference, pp. 38-43.
Sirbu, Marvin and Tygar, J.D., "NetBill: An Internet Commerce System Optimized for Network Delivered Services," IEEE 1995 Spring Conference, pp. 20-25.
Bunker, Ted, "How Auction Technology Sped and Enhanced Sale Of Radio Licenses," Investor's Business Daily, Executive Update, Regulation, p. A3, Feb. 24, 1995.
"AUCNET: The Story Continues", Harvard Business School, Jan. 17, 1995.
Anand, R., and Rao, M. Padmaja, "The Electronic Flea Market", IBM Research Division: Research Report, pp. 1-18, Jul. 28, 1994.
"Unusual Farmland Auction Set," Harrison Scott Publications, Liquidation Alert, Mar. 28, 1994.
"The Computer Museum brings auction block to cyberspace in First Internet Auction," Business Wire, Mar. 14, 1994.
Freeman, Brian and Gideon, Lidor, "Hosting Services—Linking the Information Warehouse To the Information Consumer," IEEE 1994 Spring Conference, pp. 165-171.
Booker, Ellis, "Mega real estate auction counts on imaging," Computerworld, p. 20, Dec. 7, 1992.
Abstract: "A forward/reverse auction algorithm for asymmetric assignment problems," Computational Optimization and Applications, Dec. 1992.
Abstract: "Marketel Shuts Doors," Travel Agent Magazine, Mar. 23, 1992.
Cass, Maxine, "West Coast Agents Remain Skeptical About New Air Ticket Sales Plan; Marketel: Airline ticket sales system sparks concern," Travel Agent Magazine, p. 50, Sep. 2, 1991.
Bookit!, "Airline Ticket Purchase Order For Business & Leisure Travel", Marketel International, Inc., 1991.
Inhaber, Herbert, "How To Solve the Problem of Siting Nuclear Waste," Transactions of the American Nuclear Society, vol. 62, Nov. 11-15, 1990.
Dyson, Esther, "Information, Bid and Asked," Forbes, Aug. 20, 1990.
"Mercado electronico, El chance de regatear por computador", CIENCIA Technologia E Informatica, Mar. 21, 1990 (Translation enclosed).
Cole, Jeff, "Fare bidding plan could be the ticket", St. Paul Pioneer Press Dispatch, Mar. 11, 1990.
Miller, Ross M., "The Design of Decentralized Auction Mechanisms that Coordinate Continuous Trade in Synthetic Securities," Journal of Economic Dynamics and Control, pp. 237-253, 1990.
"Business Briefing, Airline Seats May Go on the Auction Block", Insight on the news, Dec. 4, 1989.
"Business Travel Update, Automation", Travel Weekly, Nov. 27, 1989.
Munro, Don and McCann, David, "A New Way To Purchase Travel, Automated Service Would Let Companies Bid For Already-Filled Airline Seats", Business Travel News, Nov. 6, 1989.
"An Electronic Auction Ahead For Airline CRS's?", The Business Week Newsletter for Information Executives, Oct. 27, 1989.
Cohen, Danny, "Electronic Commerce," ISI Research Report, University of Southern California, Oct. 1989.
"From Airline Tickets to Human organs, the Electronic Markets are Booming", Times, vol. 3, No. 50, Aug. 14, 1989.
Coyne, Andrew, "Unbundling ideas may alter world of politics," The Financial Post (Toronto), Section 1, p. 11, Sep. 27, 1989.
Malone, Thomas W., et al., "Electronic Markets and Electronic Hierarchies," Communications of the ACM, vol. 30, No. 6, Jun. 1987.
"AUCNET: TV Auction Network System," Harvard Business School, Jul. 19, 1989.
Sammer, Harald W., "Online Stock Trading Systems: Study of an Application," IEEE 1987 Spring Conference, pp. 161-162.
Littlefair, T., "Homelink: a unique service," Computer Bulletin, pp. 12-14, Jun. 1986.
Banatre, Jean-Pierre, et al., "The Design and Building of Echere, a Distributed Electronic Marketing System," Communications of ACM, vol. 29, No. 1, Jan. 1986.
Turoff, Murray and Chinai, Sanjit, "An Electronic Information Marketplace," Elsevier Science Publishers B. V., pp. 79-90, 1985.
Banatre, Michel, "Distributed auction bidding system," IPC Business Press, Computer Communications, vol. 4, No. 4, Aug. 1981.

* cited by examiner

SYSTEM AND METHOD FOR ALLOCATING A CONDITIONAL PURCHASE OFFER FOR A TRAVEL RELATED SERVICES RESERVATION TO ONE OF A PLURALITY OF ENTITIES IN A BUYER DRIVEN ELECTRONIC COMMERCE SYSTEM

CROSS-REFERENCE TO RELATED APPLICATIONS

This application claims the benefit of U.S. Provisional Application No. 60/179,008, filed Jan. 28, 2000.

BACKGROUND

The present application relates generally to a system for processing the sale of goods and services and, more particularly, to a system and method for the allocation of conditional purchase offers ("CPOs") for travel related services reservations among multiple entities or sellers within a buyer-driven commerce system.

Most systems for processing the sale of products are seller-driven, whereby the seller prices, packages, configures and offers the product for sale, and the buyer decides whether or not to accept the seller's offer. In a buyer-driven system, however, the buyer dictates the terms of the offer and one or more sellers decide whether or not to accept the offer. A "help wanted" advertisement, for example, is a buyer-driven inquiry since the employer is looking to locate and buy the services of a qualified employee. The inquiry is advertised to a large number of potential employees, who may respond by submitting their resumes to the prospective employer.

Priceline.com Incorporated of Norwalk, Conn. is a merchant that has successfully implemented a buyer-driven system for the sale of products such as airline tickets, hotel rooms and automobiles. Priceline.com utilizes a Conditional Purchase Offer Management System, described in U.S. Pat. No. 5,794,207, U.S. application Ser. No. 08/889,319, filed Jul. 8, 1997, and International Application No. PCT/US97/15492 (each of which is incorporated herein by reference), that processes CPO's received from individual consumers. These CPO's contain one or more buyer-defined conditions for the purchase of goods or services, at a buyer-defined price. The CPO's are typically guaranteed by a general-purpose account, such as a debit or credit account, and thereby provide sellers with a mechanism for enforcing any agreement that may be reached with the consumer. The CPO's are provided by the CPO management system to sellers, either directly or using seller-supplied rules, for individual sellers to either accept or reject. If a seller accepts a CPO, the CPO management system binds the buyer on behalf of the accepting seller, to form a legally binding contract.

Thus, the CPO management system empowers individual consumers to obtain goods and services at a price set by the consumer. The CPO management system provides numerous commercial advantages to sellers as well. For example, the CPO management system permits individual sellers to effectively sell excess capacity when actual demand fails to meet forecasted demand. In particular, the CPO management system provides an effective mechanism for sellers to be confident that if they accept a consumer's offer, the consumer will purchase the requested goods or services at the agreed-upon price, and not just use the information to ascertain the seller's underlying level of price flexibility, which, if known to a seller's competitors or customers, could impact the seller's overall revenue structure.

For some sellers, response to an individual CPO is difficult without significant re-engineering of the existing transaction processing system. As a result, these sellers empower an agent to manage buyer-driven commerce transactions. These sellers become agency-based sellers, with a CPO management system acting as their agent. With multiple agency-based sellers, there is a need for efficient CPO management systems and methods to allocate CPO's among the agency-based sellers so as to maximize revenue for the agency-based seller and CPO management system.

For broadcast-based sellers, some form of allocation may also be desirable and/or necessary. For example, it may be desirable to allocate CPO's among broadcast-based sellers serial transmission to such sellers. Alternatively, if the CPO is sent simultaneously to multiple broadcast-based sellers, it may be desirable to have a method for allocating the CPO where two broadcast-based sellers respond at the same time. As such, there is a need for efficient CPO management systems and methods to optimize the allocation of resources and for the maximization of revenue generation.

SUMMARY

In one embodiment, a system and method is provided for allocating a conditional purchase offer ("CPO") for a hotel reservation or other travel related services to one of a plurality of entities in a buyer-driven system. The CPO for a hotel reservation in a specified relevant market area is received and at least one of the plurality of entities capable of satisfying the CPO is identified. A first-look opportunity to accept the CPO is allocated to one of the identified entities and, if it is determined that none of the hotels associated with that entity can accept the CPO, then a second-look opportunity to accept the CPO is provided to one of the remaining entities. In other embodiments, the first-look and second-look opportunities are allocated based on a variety of criteria or metrics, including negotiated preferences with certain sellers or suppliers that increase their allocation priority. The CPO allocation system and method of the present application may also be used in the sale of various other goods and services, including, but not limited to, rental cars, airline tickets, insurance, gasoline, supermarket products and consumer products.

BRIEF DESCRIPTION OF THE DRAWINGS

The foregoing features and other aspects of the present application are explained in the following description taken in connection with the accompanying drawings wherein.

Figure 1:
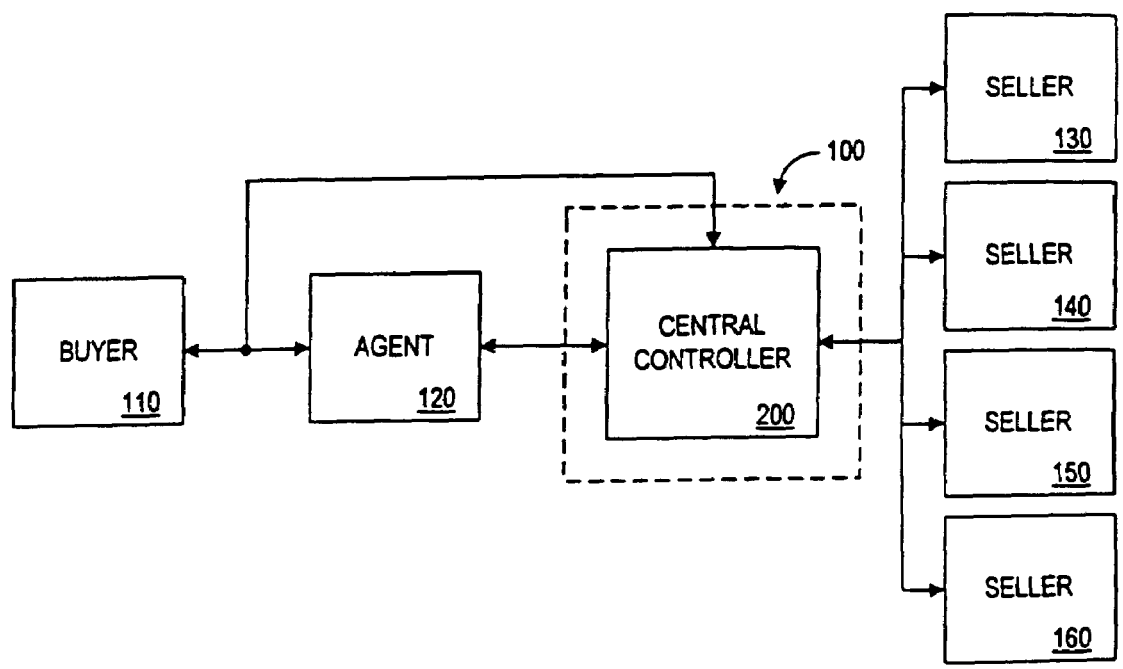
FIG. 1 is a block diagram illustrating major elements in one embodiment of the CPO management system.

The figures are understood to provide representative illustration of the invention and are not limiting in their content. The leading reference numeral(s) indicates the first figure in which that reference number is introduced.

DETAILED DESCRIPTION

FIG. 1 shows a first embodiment of a conditional purchase offer ("CPO") management system 100 for receiving and processing CPO's for one or more goods or services, from one or more buyers 110 or agents 120 (on behalf of buyers 110). The CPO management system 100 determines whether one or more sellers, such as sellers 130, 140, 150, 160 are willing to accept a given CPO. As discussed further below, if a seller accepts a given CPO, the CPO management system 100 binds the buyer on behalf of the accepting seller, to form a legally binding contract.

As used herein and in the claims, the following terms are defined to mean:

Agency-Based Seller—A seller who has delegated authority to the CPO Management System to accept or reject a given CPO using seller-defined CPO Rules.

Broadcast-Based Seller—A seller who has received a CPO from the CPO Management System (directly or by, for example, access to an electronic posting) for evaluation.

Conditional Purchase Offer (CPO)—An offer containing one or more conditions submitted by a buyer for the purchase of goods and/or services at a buyer-defined price.

Binding Conditional Purchase Offer (Binding CPO)—A binding offer containing one or more conditions submitted by a buyer for the purchase of goods and/or services at a buyer-defined price. As compared to a CPO, a Binding CPO includes a payment guarantee, for example with a General Purpose Account, and authorization to debit the Account upon acceptance of the Binding CPO.

Conditional Purchase Offer (CPO) Rule—A restriction defined by a Broadcast-Based or Agency-Based Seller under which the operator of the CPO Management System may act as an agent to determine whether to fill a CPO for that Seller.

CPO Management System—A controller that receives and processes CPO's for one or more goods or services, from one or more buyers, to determine if one or more sellers (Agency-Based or Broadcast-Based Sellers) are willing to accept a CPO.

General Purpose Account—Any account from which payment can be made, including a credit or debit account.

First-Look Opportunity—The initial opportunity given to a seller to satisfy a CPO, when the CPO management system allocates a CPO among multiple sellers.

Second-Look Opportunity—The follow-up opportunity given to a seller to satisfy a CPO, when the CPO management system allocates a CPO among multiple sellers. If the CPO is unsatisfied in the first-look opportunity, the seller given the follow-up opportunity to satisfy the CPO receives the second-look opportunity.

Rule—A restriction or restrictions defined by a seller that must be satisfied before the seller will honor a particular price or sale. In the airline industry, for example, rules include among other requirements black-out dates, day of week for origination, minimum and maximum stay length, advanced purchase requirements and cancellation/change terms.

Metric—A ranking parameter used to prioritize sellers. A metric can include seller factors such as market share, buyer factors such as preference, and random factors.

As shown in FIG. 1, the CPO management system 100 preferably includes a central controller 200, discussed further below in conjunction with FIG. 2. The CPO management system 100 may provide a given CPO to selected sellers 130, 140, 150, 160 based on pre-defined screening criteria, so that sellers only obtain CPO's that they may be interested in or are authorized to screen or have the potential to fulfill. Alternatively, the CPO management system 100 may provide all CPO's to all sellers for screening.

As discussed further below, each buyer 110 contacts the CPO management system 100, for example, by means of telephone, facsimile, online access (i.e., the Internet), electronic mail, in-person contact or through an agent, and provides the CPO management system 100 with the terms of the buyer's CPO. It is noted that each buyer 110 and seller 130, 140, 150, 160 may employ a general-purpose computer for communicating with the CPO management system 100. Though not illustrated, the general-purpose computer is preferably comprised of a processing unit, a communication device (e.g., a modem), memory means and any software required to communicate with the CPO management system 100.

The CPO management system 100, as well as any general-purpose computers utilized by buyers 110 or sellers 130, 140, 150, 160 (collectively, the "nodes") preferably transmit digitally encoded data and other information between one another. The communication links between the nodes preferably comprise a cable, fiber or wireless link on which electronic signals can propagate.

Figure 2:
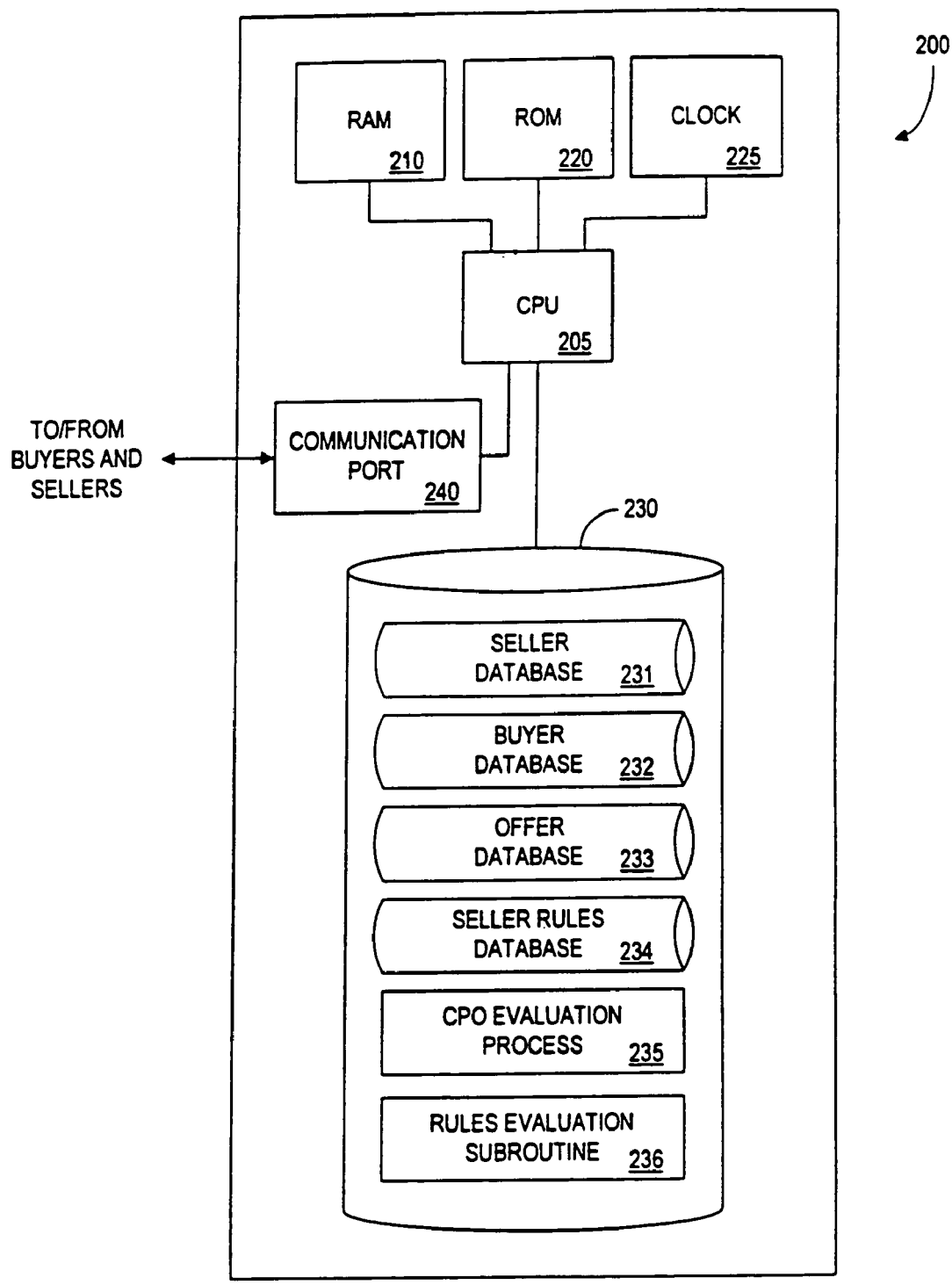
FIG. 2 is a block diagram illustrating elements of the central controller in one embodiment of the present application.

FIG. 2 is a block diagram showing the architecture of an illustrative central controller 200. The central controller 200 preferably includes certain standard hardware components, such as a central processing unit (CPU) 205, a random access memory (RAM) 210, a read only memory (ROM) 220, a clock 225, a data storage device 230 and a communications port 240. The CPU 205 is preferably linked to each of the other listed elements, either by means of a shared data bus, or dedicated connections, as shown in FIG. 2. The communications port 240 connects the central controller 200 to each buyer 110 and seller 130, 140, 150, 160. The communications port 240 preferably includes multiple communication channels for simultaneously establishing a plurality of connections.

In one embodiment, the central controller 200 operates as a web server providing a web page accessible on the world wide web, both for receiving and transmitting CPO's generated by buyer 110. The buyer 110 and seller 130, 140, 150, 160 may use conventional communications software such as the Netscape Navigator browser to communicate with the central controller 200 of the CPO management system 100. In this manner, the buyer 110 using the web browser may communicate with the CPO management system 100 (e.g., submit the CPO) by accessing or logging on to the web page associated with the central controller 200 on the world wide web.

The ROM 220 and/or data storage device 230 are operable to store one or more instructions, discussed further below, which the CPU 205 is operable to retrieve, interpret and execute. For example, the ROM 220 and/or data storage device 230 preferably store processes to accomplish the transfer of required payments, charges and debits between the sellers 130, 140, 150, 160 and buyers 110. The processing of such accounting transactions are preferably secured in a conventional manner, for example, using well-known cryptographic techniques.

The data storage device 230 preferably includes at least a seller database 231, a buyer database 232, an offer database 233 and a seller rules database 234. The seller database 231 preferably stores information on each seller 130, 140, 150, 160 that is registered with the CPO management system 100 to sell goods or services to CPO buyers, including contact information. The buyer database 232 preferably stores information on each buyer of the CPO management system 100, including identification information and billing information, such as a credit card number. The offer database 233 preferably contains a record of each CPO being processed by the CPO management system 100, including the conditions associated with the CPO and the associated status. The seller rules database 234 preferably maintains the CPO rules for one or more agency-based sellers 130, 160.

In addition, the data storage device 230 preferably includes a CPO evaluation process 235 and a rules evaluation subroutine 236. Generally, the CPO evaluation process 235: (i) receives each CPO from a buyer 110; (ii) provides each CPO to the appropriate broadcast-based sellers 140, 150 and evaluates each CPO against the appropriate rules of each agency-based seller 130, 160; and (iii) determines whether any sellers 130, 140, 150, 160 accept the CPO. The rules evaluation subroutine 236 is a subroutine executed by the CPO evaluation process 235, which receives a CPO and compares the CPO against the rules of one or more agency-based sellers 130, 160 to generate a response on behalf of the sellers to the given CPO.

Hotel Product Allocation System

In an embodiment of the present application illustrated in FIGS. 3–11, the CPO management system 100 receives and processes a CPO, such as a hotel request, from one or more buyers 110. As previously described with reference to FIGS. 1 and 2, the buyer 110 provides the CPO management system 100 with the buyer's CPO by means of, for example, telephone, facsimile, online access (i.e., the Internet), electronic mail, in-person contact or through an agent. Each buyer 110 and seller 130, 140, 150, 160 may employ a general-purpose computer for communicating with the CPO management system 100 over communication links, such as a cable, fiber or wireless link on which electronic signals (e.g., digitally encoded data) can propagate.

In addition, one or more sellers 130, 140, 150, 160 may utilize a computerized reservation system (not shown), such as a central reservation system ("CRS") (e.g., Marriott Marsha, Pegasus, Wizcom, Apollo), Global Distribution System ("GDS") (e.g., Worldspan, Sabre) or other booking engine, that contains information concerning the availability and price of hotel rooms provided by that seller and can be used to book reservations for such hotel rooms. The CPO management system 100 may communicate with the computerized reservation system to confirm availability at the rate and dates specified in the CPO and to reserve a hotel room if the CPO is accepted. Preferably, a communication link (e.g., cable, fiber, telephone line, wireless link, etc.) between the communications port 240 and the computerized reservation system permits the central controller 200 and CPO management system 100 to communicate with the seller's computerized reservation system.

The central controller 200 or similar computer apparatus processes the CPO received from buyer 110. Before processing the CPO, it may be desirable to normalize the data string associated with the CPO with an Offer Table stored in a database accessible to the controller 200. It may also be desirable for the central controller 200 to confirm that the buyer 110 provided a credit card number or other secured payment method before continuing to process the CPO.

In addition, before processing the CPO, it may be desirable for the central controller 200 to validate the CPO by, for example, comparing the specified date in the CPO (e.g., the desired hotel check-in/arrival date) to the current date and time to assure that there is sufficient time to process the CPO before the date specified in the CPO, and/or verifying that the dollar amount specified in the CPO is above a minimum threshold level for the quality of the service specified in the CPO. For instance, with respect to hotel services, hotels are commonly categorized based upon the quality of service provided using what is known as a "star rating" (i.e., five star, four star, three star, two star and one star hotel) or some other equivalent classification. A table of minimum threshold prices for each star rating level may be maintained in a database accessible by the central controller 200 to facilitate comparing the dollar amount specified in the CPO to the minimum threshold level for the minimum star rating level specified in the CPO. In order to avoid unnecessary processing, if the dollar amount specified in the CPO is not equal to or greater than the minimum threshold level, then the central controller 200 may reject and terminate processing the CPO and inform the buyer 110 that the CPO management system 100 was unable to satisfy the CPO.

Similarly, as part of the validation process, it may be desirable for the controller 200 to determine that the CPO is unique to prevent a buyer 110 from repeatedly "pinging" the CPO management system 100 to determine the underlying pricing structure. For example, the central controller 200 may check for duplicate CPO's by comparing the conditions specified in the present CPO (e.g., credit card number, check-in (arrival)/check-out (departure) dates, and geographic location or zone specified in the present CPO) to those stored and maintained in a CPO database for a predetermined period (e.g., the past seven days) and reject any CPO that matches a previous CPO stored in the CPO database within that predetermined period.

To process the CPO in accordance with the present application, which is preferably done after the CPO has been validated, the central controller 200 searches a table of potential sellers stored and maintained in a database accessible to the controller to filter for potential sellers that may be able to satisfy the CPO. In the context of hotel rooms, this table may be, for example, a Hotel Property Table listing, among other things, participating hotels (e.g., hotels that are participating and/or in partnership with the provider of the service processing the CPO), the hotels' respective locations (e.g., metro region, city, etc.), the hotels' respective star ratings or other classification indicating quality of service, and the brand and owner associated with each respective hotel (hereinafter referred to as an "entity").

Figure 3:
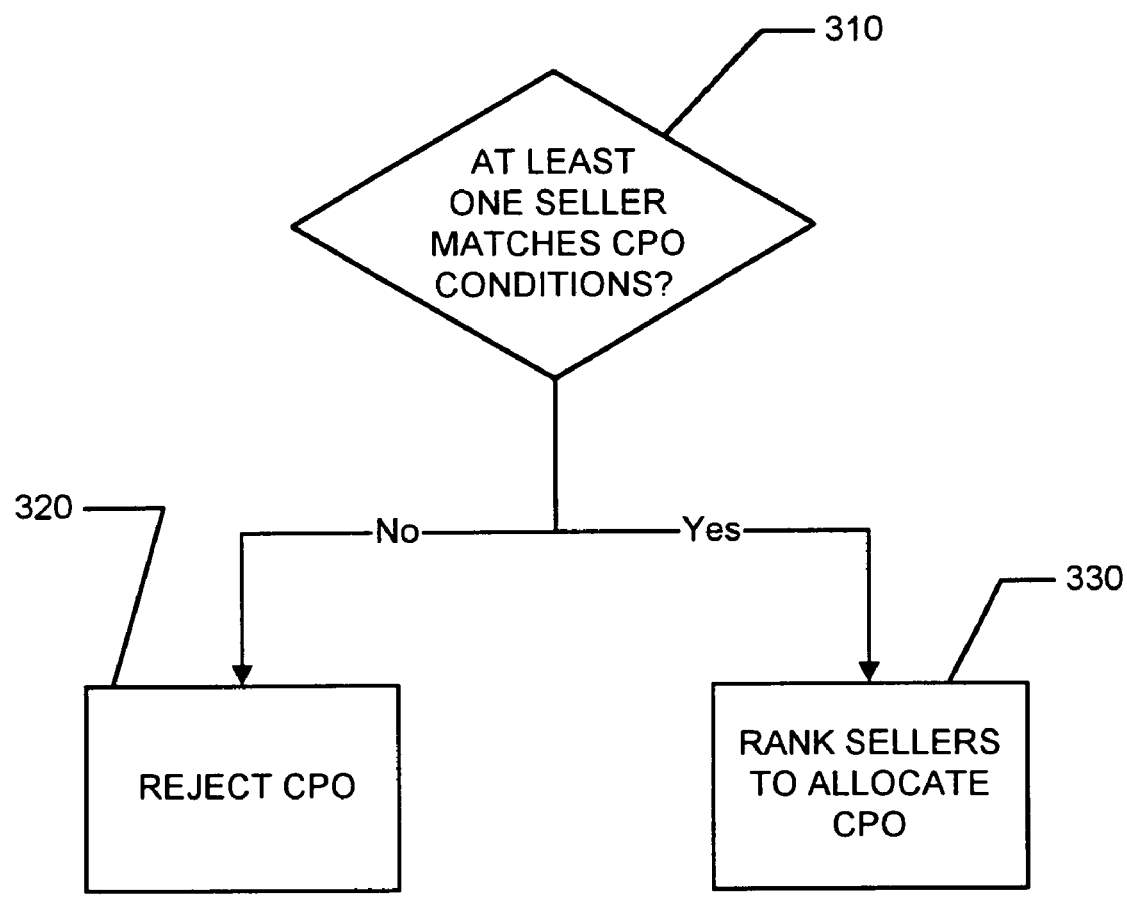
FIG. 3 is a flow chart illustrating an initial determination that there exists a qualified seller for a CPO.

Thus, in step 310 in FIG. 3, the central controller 200 preferably searches the Hotel Property Table to identify all participating and enabled hotels or sellers that can satisfy the CPO and are: (a) greater than or equal to the minimum star rating specified by the buyer 110 in the CPO, and (b) located in the geographic zone, region or city specified in the CPO by the buyer 110. If no hotels or sellers match conditions (a) and (b) above, then the CPO is preferably rejected in step 320 and the CPO management system 100 terminates the processing of the CPO and informs the buyer 110 that it was unable to satisfy the CPO.

If, however, at least one hotel or seller is identified in step 310 as matching conditions (a) and (b) above, then the central controller 200 preferably ranks those hotels and/or sellers that can satisfy the CPO in step 330 to determine the order that each hotel or seller will be searched for availability and rates on a first pass through the booking engine (i.e., first-look opportunity). A preferred ranking/allocation process is described below.

Figure 4:
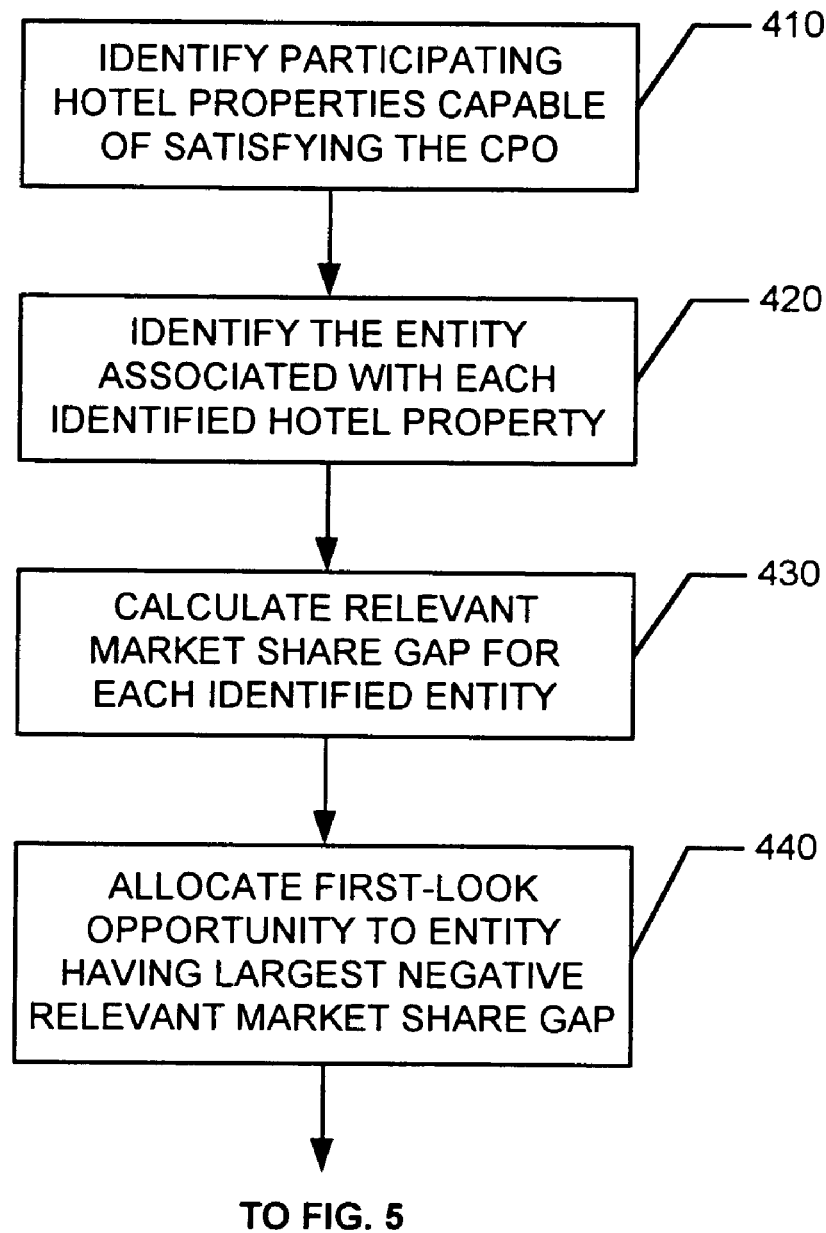
FIG. 4 is a flow chart illustrating in greater detail one embodiment for allocating an opportunity to satisfy the CPO to one or more sellers.

Referring to FIG. 4, after at least one participating and enabled hotel property is identified in step 410 as being capable of satisfying the CPO, the central controller 200 identifies the entity (i.e., brand and/or multi-property owner) that is associated with the identified hotel property in step 420. This may be accomplished by searching the Hotel Property Table, which maintains and stores, among other things, the entity (i.e., brand and/or multi-property owner) that is associated with each hotel property. A particular identified hotel property may have no more than one brand (e.g., Marriott, Hilton, etc.) and one multi-property owner (e.g., Marriott, Starwood, REIT, etc.). However, if the hotel property has neither a participating brand nor multi-property owner associated with it, then the property is considered to be an "Independent" entity. A hotel property that is enabled may (1) belong to a multi-property owner, (2) belong to a brand, or (3) be an independent entity, that participates in the buyer-driven system. If a hotel property belongs to an independent entity, however, it is not associated with a multi-property owner or brand. By belonging to a multi-property owner or brand, a hotel property may enhance its chances of allocation. In fact, in one embodiment of this allocation system, allocation preferences may be based upon negotiated preferences with certain entities or sellers that increase their allocation priority.

Once the CPO management system 100 identifies those entities associated with hotel properties capable of satisfying the CPO in step 420, then the central controller 200 preferably uses each identified entity's room share for the relevant market, region or area specified by the buyer 110 in the CPO to allocate the first-look opportunity to the identified entity having the largest "negative" differential ("relevant market share gap") between the percentage of first-look opportunities previously allocated to that entity and that entity's relevant market room share. Alternatively, the first-look opportunity may be allocated to one of the entities identified in step 420 based on relevant room market share for the market/region specified by the buyer 110 in the CPO (e.g., highest relevant market room share).

A particular entity's relevant room market share is calculated by first determining the number of hotel rooms that particular entity (brand, owner or independent) has within the market, zone or region specified by the buyer 110 in the CPO. Because an entity may have more than one hotel property located within the specified market, zone or region, the number of rooms associated with a particular entity may include more than one hotel property located within the specified market, zone or region. In the event that the location specified in the CPO is not a mapped market or region (e.g., a list of hotels within a specified geographic area), then the CPO management system 100 may utilize a blended market share for all non-mapped areas (e.g., total market share less the market share for all mapped areas/regions). The particular entity's relevant market room share is then calculated by dividing the total number of rooms that entity has within the specified market by the total number of rooms for all hotels within the specified market. Alternatively, an entity's relevant market room share may be calculated by dividing the number of hotel rooms an entity has within the specified market, zone or region by the aggregate total number of hotel rooms located within that specified market, zone or region. A preprogrammed data look-up table may be utilized in lieu of dynamic acquisition of the data to calculate relevant market room share.

The "relevant market share gap" for a particular entity is then calculated in step 430 by subtracting that entity's relevant market room share from the percentage of first-look opportunities previously provided to that entity in the specified market. This is done for each entity identified in step 420 and the entities are ranked or ordered according to their relevant market share gap over a predefined period of time. In step 440, the entity having the largest "negative" relevant market share gap is allocated the first-look opportunity to accept the CPO. Information, broken down by entity and relevant market, regarding relevant market room share, first-look opportunities and relevant market share gap is preferably stored and periodically updated in a database that is accessible to the central controller 200. Over time, use of the relevant market share gap results in allocation of first-look opportunities that approximate relative market room share.

As an alternative to allocating the first-look opportunity to the entity having the largest "negative" relevant market share gap in step 440, the first-look opportunity may be allocated using a conventional random number generator (not shown) weighted to reflect the relevant market room share to randomly allocate the first-look opportunity to satisfy the CPO to the entities identified in step 420. For example, a random number generator may assign numbers from 1 to 100 to entities based on relevant market room share (i.e., an entity with 43% relevant market room share would be assigned 43 of 100 numbers) and then randomly selecting a number from 1 to 100 to assign the first-look opportunity to satisfy the CPO to the entity associated with that number. Over time, the number of first-look opportunities given to any particular entity will approximate that entity's relevant market room share, notwithstanding that the allocation is randomly distributed.

Figure 5:
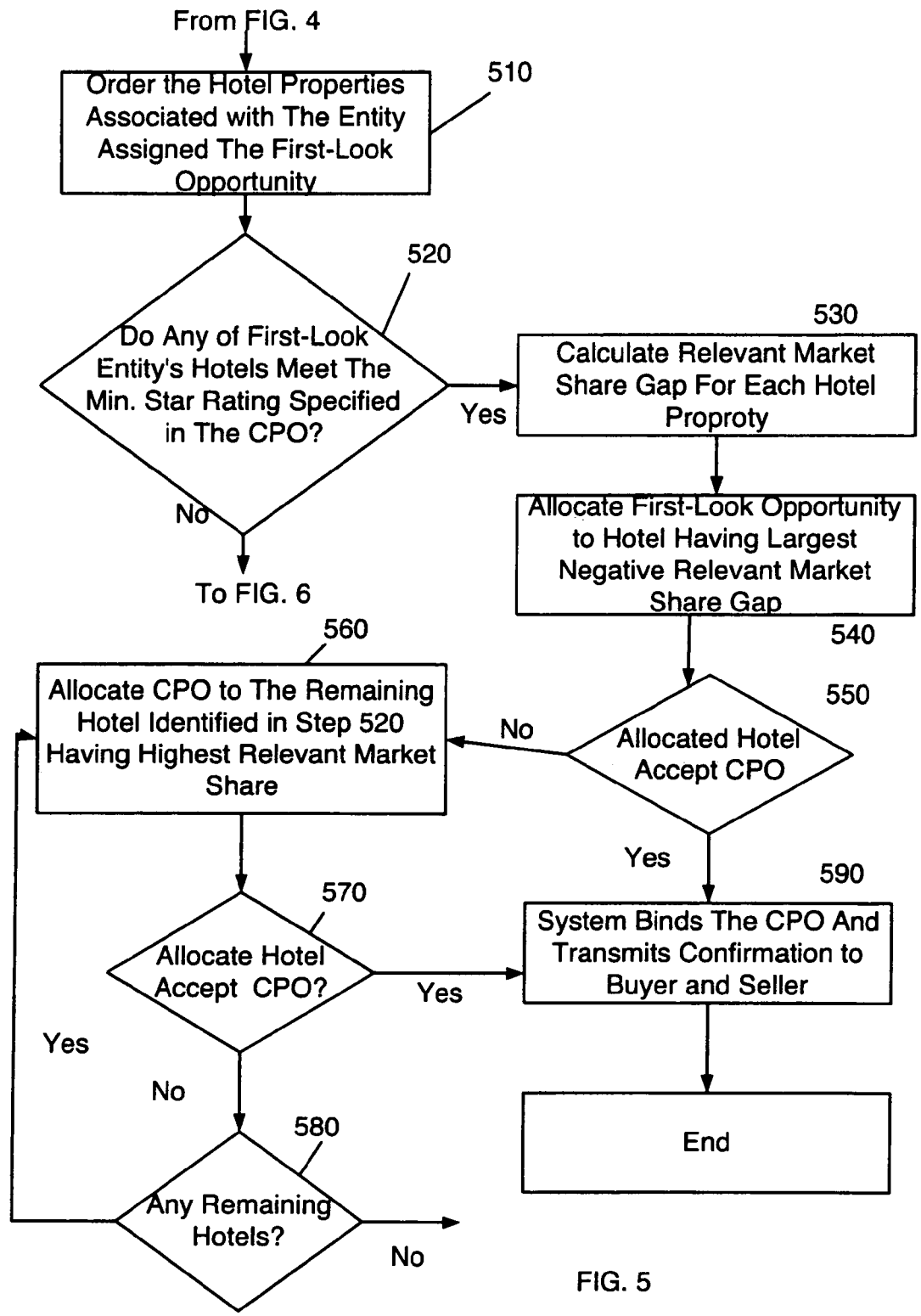
FIG. 5 is a flow chart illustrating one embodiment for allocating a first-look opportunity to satisfy the CPO to one or more sellers.

Referring now to FIG. 5, once a first-look opportunity has been allocated or assigned to a specific entity (i.e., brand, owner or independent) in step 440 (FIG. 4), that entity's hotel properties within the relevant market are preferably identified in step 510 based upon, among other things, the star ratings assigned to each property.

In one embodiment illustrated in FIG. 5, the central controller 200 identifies any hotel property associated with the entity having the first-look opportunity ("first-look entity") in step 520 that meets the minimum star rating and relevant market location specified by the buyer 110 in the CPO. Alternatively, the CPO management system 100 may blend or commingle hotel properties of different star ratings into "buckets" for allocation purposes. For instance, the CPO management system 100 may identify in step 520 any hotel property associated with the first-look entity that is in the relevant market and is of a star rating of at least that specified in the CPO (e.g., to include minimum star rating specified in CPO and one star rating level higher), which identified hotels would then be treated as if they were of the same star rating level. It is understood that the buckets may be based upon the star rating of hotel properties or some other predefined criteria (e.g., price) and that such buckets may be defined in other ways than that described above. By blending or commingling hotel properties in this manner, the buyer may reserve a higher quality hotel than requested. In addition, such blending or commingling minimizes variations in the star rating system.

If one or more of the first-look entity's hotel properties are identified in step 520, then the central controller 200 calculates the "relevant market share gap" in step 530 for each such identified hotel using the same methodology described above for computing the relevant market share gap for the entities (in step 430 of FIG. 4). A particular hotel's "relevant market room share" is calculated by dividing the total number of rooms that hotel has by the total number of rooms for all hotels within the market specified by the buyer 110 in the CPO. As discussed above, in the event that the location/market specified by the buyer in the CPO is not a mapped market or region, then the CPO management system 100 may utilize a blended market share (i.e., total or aggregate market less all mapped areas/regions) for all non-mapped areas. Of course, it is understood that the CPO may be allocated to the first-look entity's hotel properties on a different basis, such as random assignment, bind rate, or other methods.

The "relevant market share gap" for a particular hotel is then calculated in step 530 by subtracting the hotel's relevant market room share from the percentage of first-look opportunities previously provided to that hotel. This is done for each hotel identified in step 520 and the hotels are ranked or ordered according to their relevant market share gap. In step 540, the hotel having the largest "negative" relevant market share gap (i.e., the largest negative difference between the percentage of first-look opportunities provided to the hotel property and the hotel's relevant market room share) is allocated the first-look opportunity to accept the CPO. Information, broken down by hotel property, regarding relevant market room share, first-look opportunities and relevant market share gap is stored and periodically updated in a database that is accessible to the central controller 200 of the CPO management system 100. This information may also be updated only for the entity allocated the first-look opportunity.

If that selected hotel cannot accept the CPO in step 550, then the CPO management system 100 will rank or order the first-look entity's remaining hotel properties at that star rating level (or commingled star rating level) by relevant market share size and will preferably seek to allocate the CPO in step 560 to the hotel having the largest relevant market share size. This process in steps 560–580 continues until one of the first-look entity's hotels identified in step 520 accepts the CPO (step 570) or it is determined in step 580 that none of the hotels identified in step 520 can accept the CPO.

Alternatively, the CPO management system 100 may group the first-look entity's hotels into buckets as previously described. The hotels within each bucket may be randomly ordered or ordered by a predefined criteria or metrics (e.g., relevant market share size, first-look bind rate, etc.) and thereafter processed in that order to attempt to book the CPO. It is understood that the construction of such buckets may be made flexible to include one or more star ratings or other predefined criteria.

Figure 6:
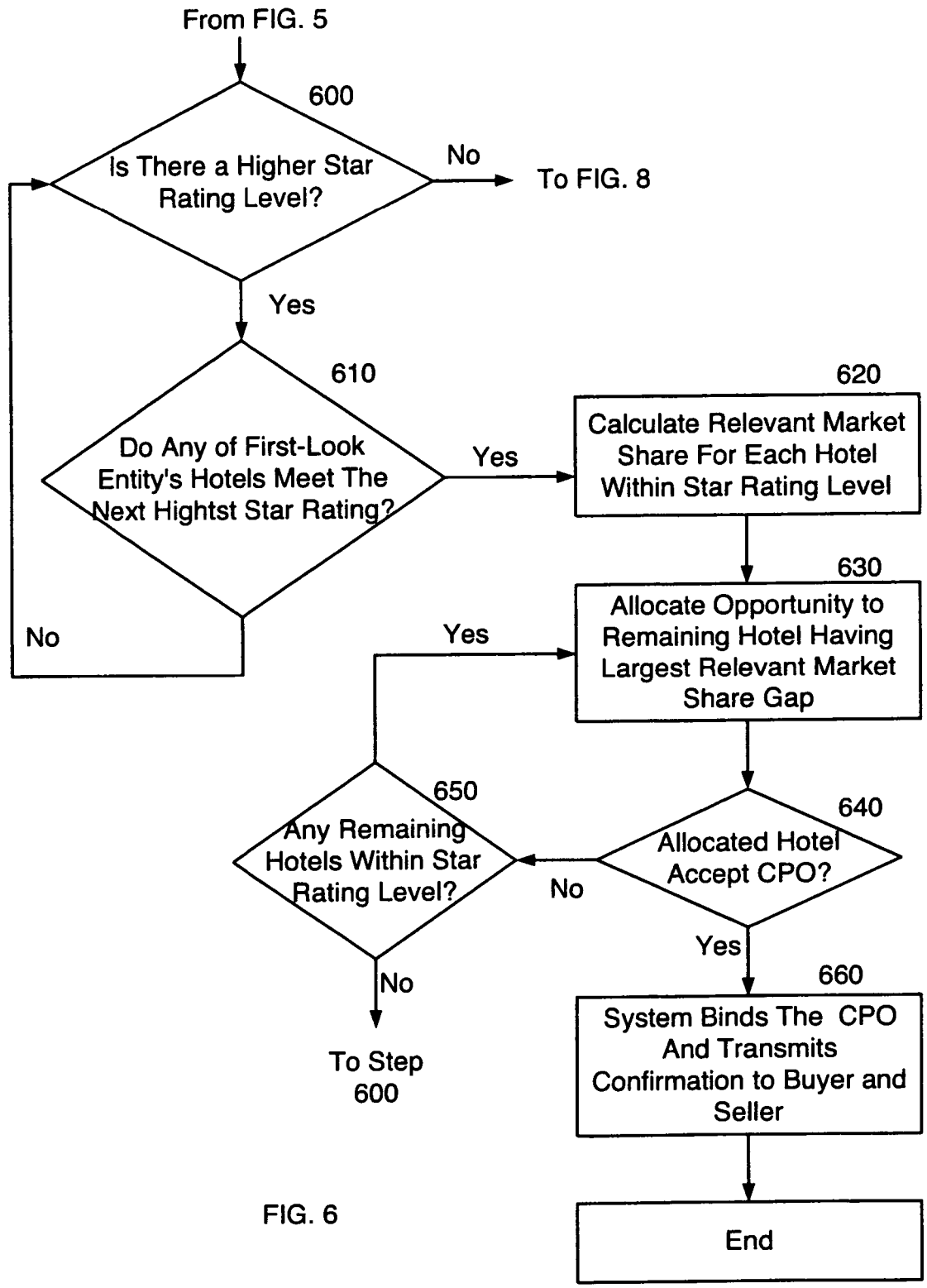
FIG. 6 is a flow chart illustrating one embodiment for allocating a first-look opportunity to satisfy the CPO to one or more hotels associated with the seller allocated the first-look opportunity in FIG. 5.

If none of the first-look entity's hotels identified in step 520 meet the minimum star rating (or commingled star rating) in the relevant market specified in the CPO, then the central controller 200 will identify in step 600 in FIG. 6 whether there is a higher star rating level that may be considered for allocation purposes. If it is determined that there is no higher star rating level in step 600, then referring to FIG. 7, the controller 200 will allocate a second-look opportunity to one of the entities (i.e., brand, owner or independent) identified in step 420 (FIG. 4).

However, if the controller 200 determines that there is a higher star rating level for consideration in step 600, then the system 100 will identify in step 610 any of the first-look entity's hotels in the relevant market that are preferably at one star rating above that specified in the CPO. If hotels of different star rating levels are blended or commingled in step 520, then the system 100 will identify in step 610 any of the first-look entity's hotels in the relevant market that are one or possibly more star rating levels higher than the highest star rating previously considered in step 520. Any hotels identified in step 610 are then preferably ordered by relevant market share size in step 620 and the CPO management system 100 allocates the CPO in step 630 to the first-look entity's hotel having the largest relevant market share size in that star rating level (or commingled star rating level). If that hotel cannot accept the CPO in step 640, then the CPO management system 100 will attempt to allocate the CPO to the first-look entity's hotel having the next largest relevant market share size in that star rating level (or commingled star rating level) in step 650. This process in steps 630–650 continues until one of the first-look entity's hotels identified in step 610 accepts the CPO (steps 640, 660) or it is determined in steps 640 and 650 that none of the first-look entity's hotels identified in step 610 can accept the CPO.

If none of the first-look entity's hotels identified in step 610 can accept the CPO in steps 640 and 650, then the central controller 200 will identify in step 600 whether there is a higher star rating level that may be considered for allocation purposes. If it is determined that there is no higher star rating level in step 600, then referring to FIG. 7, the controller 200 will allocate a second-look opportunity to one of the entities (i.e., brand, owner or independent) identified in step 420 (FIG. 4).

However, if the controller 200 determines that there is a higher star rating level for consideration in step 600, then the CPO management system 100 will in step 610 identify any of the first-look entity's hotels in the relevant market that are at the next higher star rating level (or commingled star rating level) above that previously considered. If no hotels are identified in step 610, then the central controller 200 will identify any of the first-look entity's hotels in the next higher star rating level (or commingled star rating level) in step 600. Any hotels identified in step 610 are ranked or ordered by relevant market room share in step 620 and then, in step 630, the CPO is offered or allocated to the first-look entity's hotel having the highest relevant market share in that star rating level (or commingled star rating level). It is understood that criteria or metrics other than relevant market room share (e.g., bind rate, preference, etc.) may be utilized for ranking the hotel properties. If that hotel cannot accept the CPO in step 640, then the CPO management system 100 will in step 650 attempt to allocate the CPO to the hotel having the next largest relevant market share size in that star rating level (or commingled star rating level). This process in steps 630–650 will be repeated until one of the first-look entity's hotels in the relevant market at that star rating level (or commingled star rating level) accepts the CPO (steps 640, 660) or it is determined in step 650 that none of the first-look entity's hotels in the relevant market at that star rating level (or commingled star rating level) can accept the CPO, in which case, the process repeats itself beginning at step 600 to determine whether there is a higher star rating level (or commingled star rating level) than that previously considered.

Figure 7:
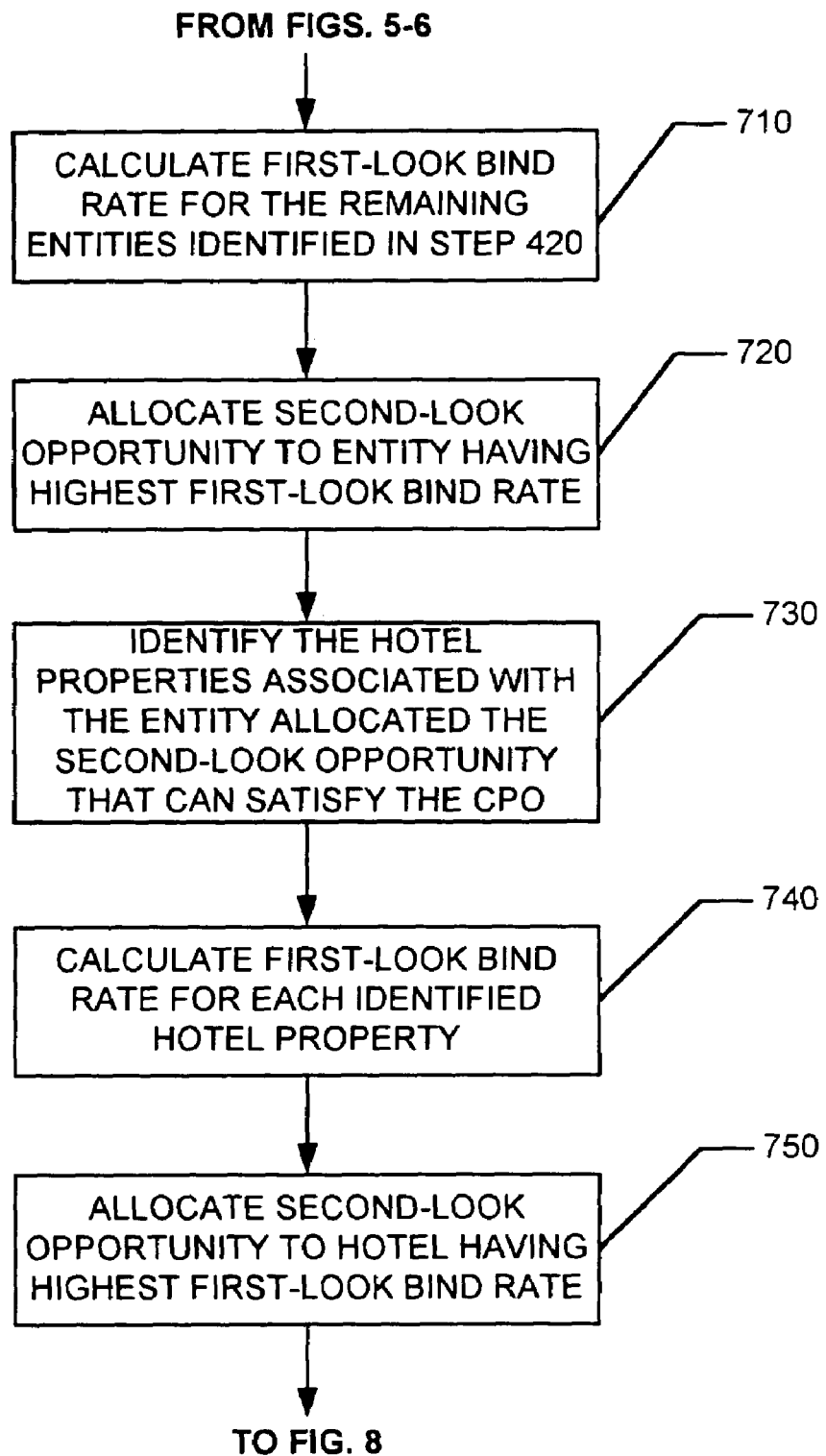
FIG. 7 is a flow chart illustrating one embodiment for allocating a second-look opportunity to satisfy the CPO to one or more sellers.
Figure 8:
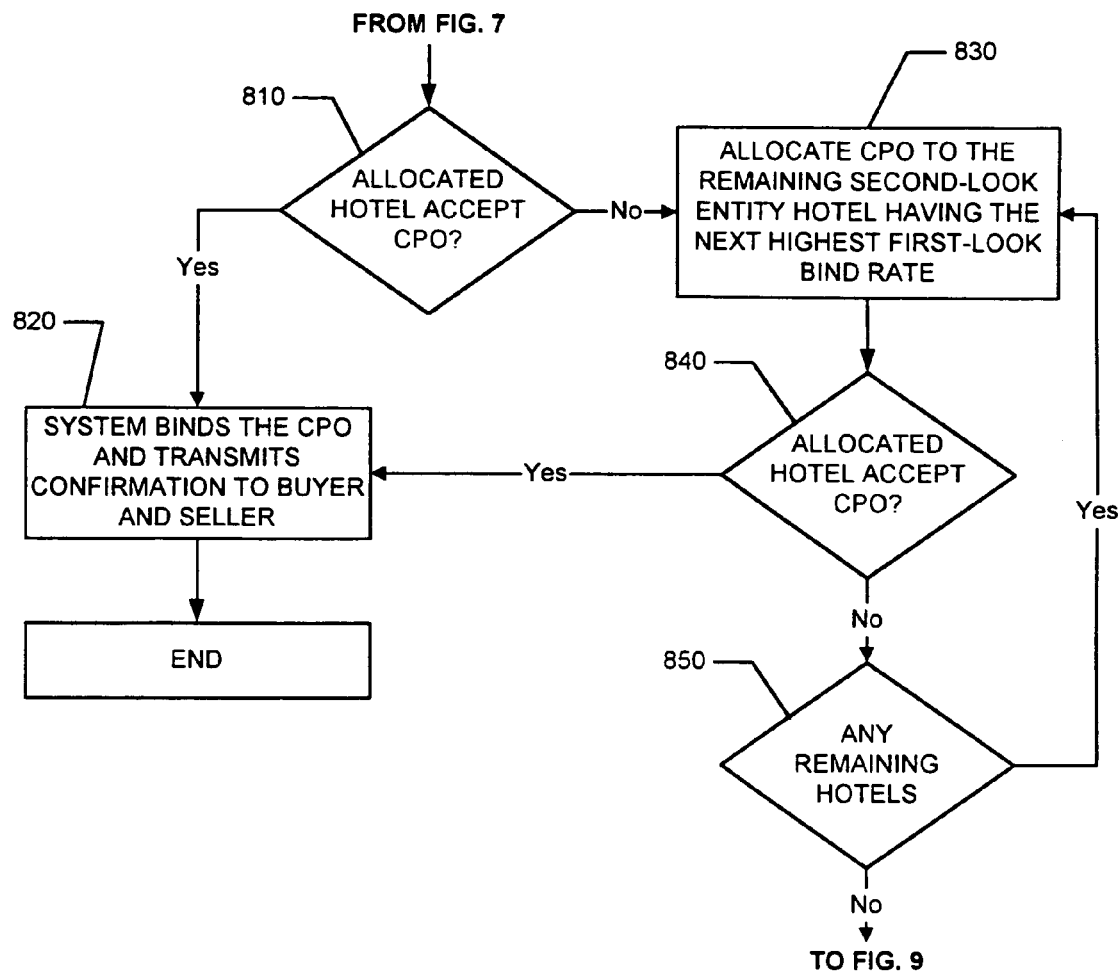
FIG. 8 is a flow chart illustrating one embodiment for allocating an opportunity to satisfy the CPO to one or more hotels associated with the seller allocated the second-look opportunity in FIG. 7.

If none of the first-look entity's hotels in the relevant market can accept the CPO (steps 540–580 (FIG. 5), 640–650 (FIG. 6)), then, referring to FIG. 7, the controller 200 will allocate a second-look opportunity to at least one of the entities (i.e., brand, owner or independent) identified in step 420 (FIG. 4). This second-look opportunity is preferably provided to the entity identified in step 420 having the largest "first-look bind rate," which is the ratio of first-look offers previously filled by that entity to first-look opportunities previously provided to that entity. This historical information, broken down by entity, is preferably stored and periodically updated in a database that is accessible to the controller 200 of the CPO management system 100.

Thus, when none of the first-look entity's hotel properties can satisfy the CPO, the CPO management system 100 preferably calculates and ranks the remaining entities previously identified in step 420 in order of highest to lowest "first-look bind rate" in steps 710. The entity having the highest "first-look bind rate" is then provided with the second-look opportunity to satisfy the CPO in step 720.

In step 730, the central controller 200 next identifies those hotel properties associated with the entity provided the second-look opportunity ("second-look entity") that are located in the relevant market and are capable of satisfying the CPO. These second-look entity hotels may be grouped into "buckets" for consideration based upon their respective star ratings. Each bucket may be predefined to contain hotels of only one star rating level or blended/commingled star rating levels (e.g., minimum star rating level specified in CPO and one star rating level higher). The "first-look bind rate" is then calculated for the hotels identified in step 730 and the second-look entity's hotels are ranked in order of "first-look bind rate." The second-look entity hotel property having the highest "first-look bind rate" within the desired star rating level (or bucket of blended/commingled star rating levels) is allocated the first "second-look opportunity" to satisfy the CPO in step 750. Should this second-look hotel be unable to accept the CPO in step 810 in FIG. 8, then the CPO management system 100 in step 830 determines whether there are any remaining second-look entity hotels in that star rating level or bucket and, if so, provides the second-look entity's hotel having the next highest "first-look bind rate" with the opportunity to accept the CPO in step 830. This process in steps 810–850 continues for all of the star rating levels or buckets until one of the second-look entity's hotels identified in step 730 accepts the CPO (step 1040) or it is determined in step 1050 that none of the second-look entity's hotels can accept the CPO.

Figure 9:
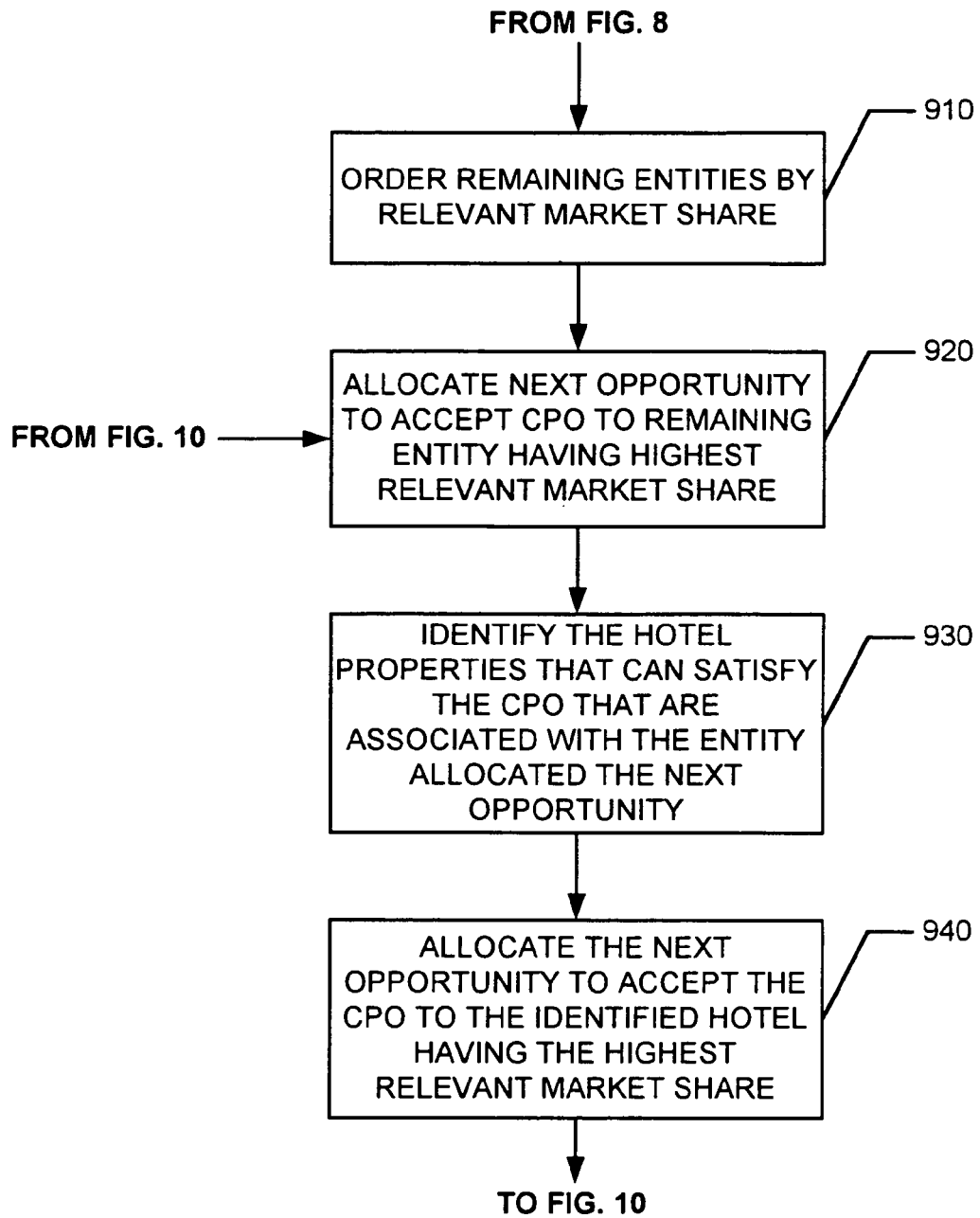
FIG. 9 is a flow chart illustrating one embodiment for allocating a third and subsequent look opportunity to satisfy the CPO to one or more sellers that have not previously been allocated an opportunity to satisfy the CPO.

In the event that none of the second-look entity's hotels can satisfy the CPO in step 850, then, in step 910 of FIG. 9, the central controller 200 will preferably rank the remaining entities identified in step 420 in order from highest to lowest relevant market share. Alternatively, the remaining entities may be ranked based upon first-look bind rate or bind rate. The CPO management system 100 will then allocate in step 920 the next or third-look opportunity to accept the CPO to the remaining entity identified in step 720 having the highest relevant market share, highest first-look bind rate, or simply the highest bind rate. That third-look entity's hotel properties within the relevant market will then be ranked by star rating level or commingled star rating level in order of market share in the relevant market or bind rate, and the central controller 200 will preferably allocate the next opportunity to accept the CPO in step 940 to the third-look entity's hotel having the highest relevant market share or bind rate within the desired star rating level or commingled star rating level.

Figure 10:
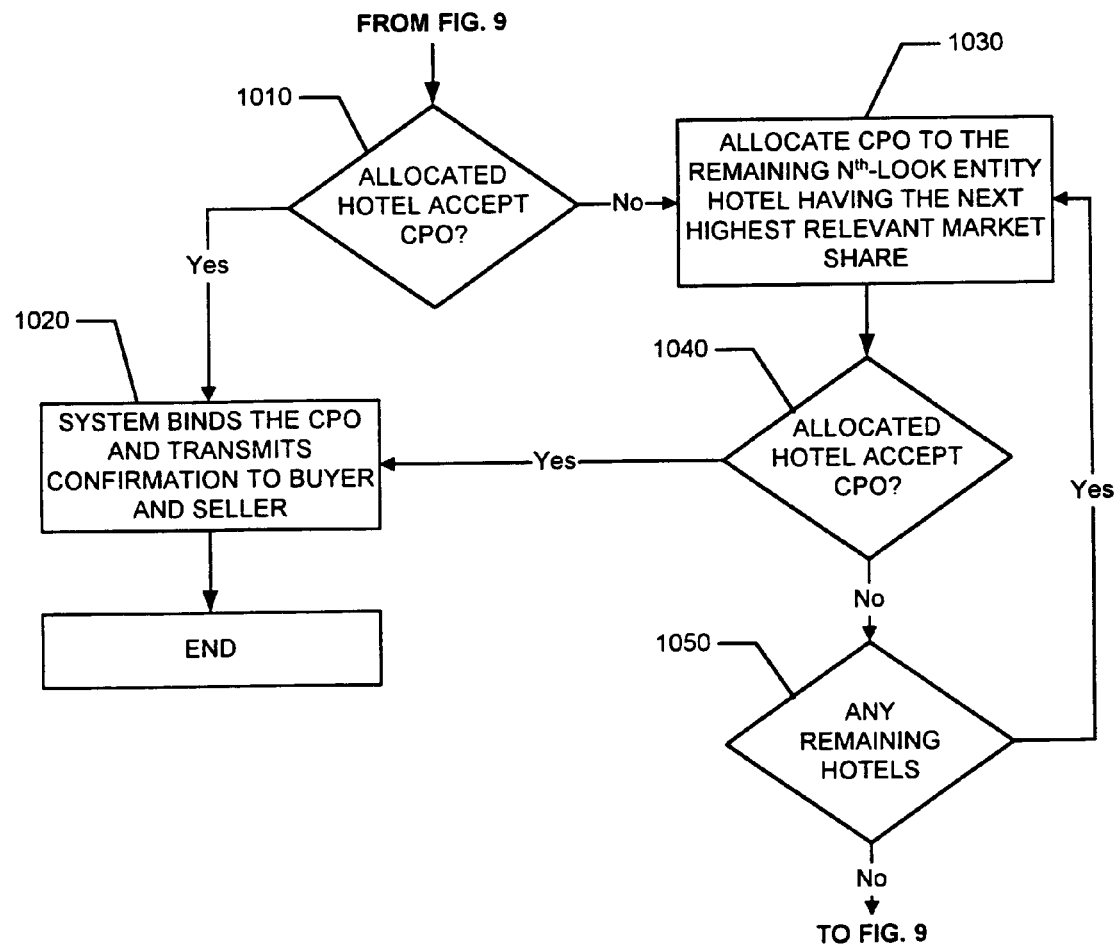
FIG. 10 is a flow chart illustrating one embodiment for allocating an opportunity to satisfy the CPO to one or more hotels associated with the seller allocated the third and subsequent look opportunity in FIG. 9.

Referring to FIG. 10, should that third-look entity's hotel be unable to accept the CPO in step 1010, then the central controller 200 will preferably allocate the next opportunity to accept the CPO to the third-look entity's hotel having the next highest relevant market share within the desired star rating level or commingled star rating level in step 1030. This process in steps 1030–1050 continues until one of the third-look entity's hotels accepts the CPO in step 1040 or it is determined that none of the third-look entity's hotels can accept the CPO, in which case, the CPO management system 100 allocates the next opportunity to satisfy the CPO to the third-look entity's hotel in a higher star rating level or bucket based upon relevant market share.

If none of the third-look entity's hotels can accept the CPO, then the CPO management system 100 will attempt to allocate the next or $N^{th}$-look opportunity to the entity having the next highest relevant market share in step 920, and steps 930–1050 are then repeated for the hotel properties associated with that $N^{th}$-look entity. If none of the $N^{th}$-look entity's hotel properties can accept the CPO, then the system 100 will allocate the next opportunity to one of the remaining entities preferably having the next highest relevant market share and this process in steps 920–1050 will be repeated until it is determined that none of the entities identified in step 910 can accept the CPO.

Should one of the allocated hotel properties accept the CPO (steps 550, 570, 640, 810, 840, 1010, 1040), then the CPO management system 100 will bind the CPO, transmit a confirmation to the buyer 110 and seller (steps 590, 660, 820, 1020), and terminate processing of the CPO. In determining whether a hotel can accept the CPO, the CPO management system 100 may communicate with a computerized reservation system, CRS, GDS or other hotel booking engine (not shown) to confirm availability at the rate and dates specified in the CPO and to reserve the hotel room(s) on behalf of the buyer 110 if the CPO is accepted. As discussed above, a communication link between the communications port 240 of the CPO management system 100 and the seller's computerized reservation system, CRS or hotel booking engine permits the central controller 200 to communicate with the seller's computerized reservation system, CRS or booking engine.

Alternatively, it is understood that the present application may be configured to go through the entire allocation process to create a table of hotel properties ranked from 1 to N, and then query the seller's computerized reservation system, CRS or booking engine to determine whether the hotel property allocated the CPO can satisfy the CPO. In this arrangement, the first hotel property that books the CPO ends the querying process.

In addition, for customer relations purposes, after one of the allocated hotel properties accepts the CPO (steps 550, 570, 640, 810, 840, 1010, 1040) and prior to binding the CPO, controller 200 of the CPO management system 100 may compare the dollar amount specified in the CPO and accepted by the allocated hotel property to the lowest published rate of that hotel property that is stored in a database accessible to the controller 200. The CPO management system 100 may be programmed not to bind the CPO if the dollar amount of the accepted CPO is above the lowest published rate of the hotel property.

It is understood that the system may query a reservation system after each allocation to a hotel, thereby avoiding the need to allocate opportunities if a hotel accepts the CPO. Alternatively, the system may complete the entire ranking process and then sequentially query the reservation system until a hotel accepts the CPO.

In determining whether a hotel can accept the CPO, the CPO management system 100 also preferably considers whether the price/rate specified by the buyer 110 in the CPO will satisfy any margin requirements. The CPO management system 100 preferably seeks to attempt to bind the CPO (e.g., book the hotel) at a positive, predefined margin requirement, and if it is unable to do so, the CPO management system 100 will attempt to bind the CPO at the rate closest to the system's predefined margin requirement.

In some instances, the service provider operating the CPO management system 100 may elect to subsidize a portion of the rate charged by the hotel above the rate specified by the buyer 110 in the CPO. Margin and subsidy amounts, if any, may be defined, stored and maintained in one or more databases (not shown) accessible to the central controller 200 based on specific entities, hotels, geographic region, star rating level, dates or period of stay, etc. In determining whether a particular hotel can satisfy a CPO, the CPO management system 100 may take into consideration any margin and subsidy amounts applicable to the particular hotel, specific entities, geographic region, star rating level, dates or period of stay, etc.

To determine relevant market share, "relevant market share gap", "first-look bind rate", etc., the central controller 200 preferably accesses one or more databases containing market share and other information for participating entities (hotel brand or property owner) and hotels within a specific market (region). It is understood that these databases may be compiled in real time or updated periodically. For instance, a Market Share Entity Table may preferably be accessed by the central controller 200 to obtain the following information for participating entities based upon the relevant or specific market specified by the buyer in the CPO:

- Area ID—corresponds to a specific market (region) or, if no regioned area exists, then to a special geographic area or market equivalent to the entire, national or aggregate market (e.g., U.S.) less all other regioned areas.
- Entity ID—identifies any hotel brands and property owners within the specified Area ID.
- Entity Type—indicates whether the entity listed in the Entity ID column is a brand or owner by, for example, using "B" for brand and "O" for owner.
- Num Properties—automatically calculates and lists the total number of "enabled" hotels for the specified Area ID and Entity ID/Type.
- Num Rooms—automatically calculates and lists the total number of hotel rooms in the specified Area ID for the particular entity (Entity ID).
- Market Share—automatically calculates and lists market share for a given entity using the ratio of the total number of rooms a particular entity has within the specified Area ID to the total number of rooms for all "enabled" hotels in the specified Area ID.
- Times Ranked—stores the total number of times the particular entity (Entity ID) was ranked in the specified Area ID (incremented once each time).
- Times Ranked First—stores the total number of times the particular entity (Entity ID) was ranked first in the specified Area ID (incremented once each time entity ranked first).
- Times Booked When First—stores the total number of times the particular entity (Entity ID) ranked first and any of that entity's hotels were booked (incremented each time even if that hotel was not in the absolute first position).
- First-Look Bind Rate—calculates and stores the ratio of the number stored in the Times Booked When First column to the number stored in the Times Ranked First column.

Similarly, a Market Share Hotel Table may preferably be accessed by the central controller 200 to obtain the following information for participating hotels:

- Hotel ID—corresponds to the hotel id in the Hotel Property Table.
- Entity Type—identifies the hotel as being associated with an Owner ("O"), Brand ("B") or independent ("I") entity. As discussed above, a given hotel or property may be associated with no more than two entities. This is determined by the presence or absence of values in its Owner ID and Brand ID columns and the partner flag on those owner and brand records in the property owner and hotel brand tables. If a property has an owner that is a partner (i.e., participating with the provider of the service processing the CPO), then the hotel is associated with that owner entity. If a property has a brand that is a partner, then the hotel is associated with that brand entity. A hotel may be associated with both an owner and a brand entity. If a property has neither a brand nor owner that is a partner, then the hotel is considered to be associated with an independent entity and cannot be associated with either a brand or owner entity. An "enabled" hotel is always associated with at least one owner, brand or independent entity, but never all three.
- Market Share—calculates and stores the ratio of the number of rooms in this hotel to the total number of rooms in enabled hotels in the specified region or area that this particular hotel exists in.
- Times Ranked—stores the total number of times the particular hotel (Hotel ID) was ranked in a property ranking list and the hotel has an associated owner/brand/independent entity. This column is only incremented once each time.
- Times Ranked First—stores the total number of times the particular hotel (Hotel ID) was ranked first in a property ranking list and its associated owner/brand/independent entity was ranked first in an entity ranking list (incremented once each time entity ranked first).
- Times Booked When First—stores the total number of times the particular hotel (hotel ID) is ranked first in a property ranking list, its associated owner/brand/independent entity is ranked first in an entity ranking list, and the particular hotel successfully books (incremented once each time).
- First-Look Bind Rate—calculates and stores the ratio of the number stored in the Times Booked When First column to the number stored in the Times Ranked First column.

The Market Share Entity Table and the Market Share Hotel Table may preferably be stored, maintained and continuously or periodically updated in one or more databases (not shown) accessible to the central controller 200 of the CPO management system 100.

Automobile Rental Allocation System

The above-identified CPO management system 100 (FIGS. 1–2) is also applicable to CPO's concerning the rental of automobiles or other travel related services. For instance, in another embodiment, the central controller 200 receives one or more CPO's for automobile rental reservations from buyers 110 in a manner similar to that described above with respect to hotel reservations. The CPO may specify the price, rate type (e.g., daily, weekly, monthly, weekend, etc.), desired date(s) and geographic location for rental, and the type of automobile sought to be rented (e.g., compact, mid-sized, full-sized, luxury, convertible, minivan, sports utility vehicle, etc.). The central controller 200 processes the CPO to identify at least one of a plurality of sellers or entities (rental companies) in the relevant market capable of satisfying the CPO.

The CPO management system 100 thereafter ranks the identified sellers or entities based upon a predetermined criteria or metrics (e.g., market share, first-look bind rate, performance, preference, etc.) and allocates a first-look opportunity to satisfy the CPO to one of the identified sellers or entities based upon that predetermined criteria. For instance, the identified sellers or entities may be ranked by their respective market share in the relevant market ("relevant market share") and the first-look opportunity may be allocated, for example, using a conventional random number generator (not shown) weighted to reflect each seller or entity's relevant market share to randomly allocate the first-look opportunity to satisfy the CPO to the identified entities. The random number generator may assign numbers (e.g., from 1 to 100) to sellers or entities based on relevant market share (i.e., a seller or entity with 43% relevant market share would be assigned 43 of 100 numbers) and then randomly selecting a number (e.g., from 1 to 100) to assign the first-look opportunity to satisfy the CPO to the seller or entity associated with that number. Over time, the number of first-look opportunities given to any particular seller or entity will approximate that entity's relevant market share, notwithstanding that the allocation is randomly distributed.

Once the first-look opportunity is allocated to one of the identified sellers or entities, then the CPO management system 100 will determine whether that first-look entity will accept the CPO. This may be accomplished, for instance, by querying, in a manner similar to that discussed above with respect to hotel reservations, a computerized reservation system associated with that first-look seller or entity (e.g., Maestro, Odyssey or ANC), a GDS (e.g., Worldspan) or some other booking engine for determining availability, price and reserving rental cars through the first-look seller or entity.

If the first-look seller or entity cannot accept the CPO, then the central controller 200 will allocate a second-look opportunity to satisfy the CPO to one of the remaining sellers or entities identified above. Again, allocation of the second-look opportunity may be based on a predetermined criteria or metric, such as market share, first-look bind rate, performance, preference, etc. Should it also be determined that the second-look seller or entity cannot satisfy the CPO, then the central controller 200 will allocate a $N^{th}$-look opportunity to satisfy the CPO to one of the remaining sellers or entities identified above. Like the first and second look opportunities, the Nth-look opportunity to satisfy the CPO may be allocated based on a variety of criteria or metrics (e.g., market share, first-look bind rate, performance, preference, etc.). This process will continue until one of the sellers or entities accepts the CPO or it is determined that none of the sellers or entities can accept the CPO.

Although illustrative embodiments and various modifications thereof have been described in detail herein with reference to the accompanying drawings, it is to be understood that the present application is not limited to these precise embodiments and the described modifications, and that various changes and further modifications may be effected therein by one skilled in the art without departing from the scope or spirit of the invention as defined in the appended claims. For instance, a seller, entity or hotel may alternatively be allocated a CPO based on the frequency that such seller, entity or hotel books with or otherwise accepts CPO's from the CPO management system 100, or the amount of revenue or profit earned by the CPO management system 100 in connection with such seller, entity or hotel.

In addition, although the above-described system and method of the present application has been described in the exemplary context of the offer and rental of hotel rooms and/or automobiles, it is understood that the system and method of the present application is applicable to any industry where a buyer-driven commerce model can be applied, such as the offer and sale of airline tickets, automobile sales, telephone services, insurance sales, consumer products, grocery store products, etc.

We claim:

1. A method of using a computer system to allocate a conditional purchase offer for a hotel reservation to one of a plurality of entities in a buyer-driven system, comprising:
    receiving on said computer the conditional purchase offer for a hotel reservation in a specified relevant market area;
    identifying via said computer at least one of the plurality of entities capable of satisfying the conditional purchase offer; wherein the identifying step comprises:
        searching a database to identify hotel properties within the relevant market area that can satisfy the conditional purchase offer; and
        for each identified hotel property, identifying the entity associated with the identified hotel property; and
    determining each identified entity's market share percentage in the relevant market area;
    determining a percentage of first-look opportunities previously provided to each of the identified entities in the relevant market area;
    determining a relevant market share gap for each of the identified entities by subtracting the percentage of first-look opportunities previously provided to the entity in the relevant market area from that entity's market share percentage in the relevant market area; and
    allocating the first-look opportunity to accept the conditional purchase offer to the identified entity having the largest negative relevant market share gap.

2. The method according to claim 1, wherein an entity's market share percentage is the ratio of the number of hotel rooms the entity has within the relevant market area to the total number of hotel rooms within the relevant market.

3. The method according to claim 1, wherein an entity's market share percentage is the ratio of hotels associated with the entity within the relevant market area to the total number of hotels within the relevant market.

4. The method according to claim 1, further comprising allocating an opportunity to accept the conditional purchase offer to one of the identified hotels associated with the entity allocated the first-look opportunity.

5. The method according to claim 4, further comprising:

ranking the identified hotels assigned to the entity having the first-look opportunity according to a predetermined metric; and allocating a first opportunity to satisfy the conditional purchase offer to the identified hotel assigned to the entity having the first-look opportunity that satisfies the predetermined metric.

6. The method according to claim 5, wherein the conditional purchase offer includes a minimum quality of service rating acceptable to the buyer and each identified hotel assigned to the entity having the first-look opportunity is grouped according to the quality of service rating assigned to the hotel.

7. The method according to claim 6, further comprising:
selecting at least one of the identified hotels associated with the first-look entity that satisfies the minimum quality of service rating specified in the conditional purchase offer;

determining each selected hotel's market share percentage in the relevant market area;

determining a percentage of first-look opportunities previously provided to each of the selected hotels in the relevant market area;

determining a relevant market share gap for each of the selected hotels by subtracting the percentage of first-look opportunities previously provided to the hotel in the relevant market area from that hotel's market share percentage in the relevant market area; and allocating the first opportunity to accept the conditional purchase offer to the selected hotel having the largest negative relevant market share gap.

8. The method according to claim 7, further comprising determining whether the hotel allocated the first opportunity can accept the conditional offer.

9. The method according to claim 8, further comprising binding the buyer to the conditional purchase offer if the hotel allocated the first opportunity accepts the conditional purchase offer.

10. The method according to claim 8, further comprising allocating an opportunity to accept the conditional purchase offer to another of the selected hotels associated with the first-look entity if the hotel allocated the first opportunity does not accept the conditional purchase offer.

11. The method according to claim 10, further comprising:
ranking the selected hotels associated with the first-look entity in order of market share in the relevant market area; and allocating an opportunity to accept the conditional purchase offer to the selected hotel associated with the first-look entity having the largest market share that was not previously allocated an opportunity to accept the conditional purchase offer.

12. The method according to claim 11, further comprising:
determining whether the hotel allocated the opportunity can accept the conditional purchase offer; and allocating an opportunity to accept the conditional purchase offer to a remaining one of the selected hotels associated with the first-look entity having the largest market share that was not previously allocated an opportunity to accept the conditional purchase offer.

13. The method according to claim 11, further comprising binding the buyer to the conditional purchase offer if the hotel allocated the opportunity accepts the conditional purchase offer.

14. The method according to claim 12, further comprising:
selecting the identified hotels associated with the first-look entity that exceed the minimum quality of service rating specified in the conditional purchase offer and have not previously been provided an opportunity to satisfy the conditional purchase offer;

determining a relevant market share for each of the selected hotels; and allocating an opportunity to accept the conditional purchase offer to the selected hotel having the largest relevant market share.

15. The method according to claim 12, further comprising allocating a second-look opportunity to accept the conditional purchase offer to another of the identified entities if none of the hotels associated with the entity allocated the first-look opportunity can accept the conditional purchase offer.

16. The method according to claim 15, further comprising:
determining a number of first-look opportunities filled by each identified entity;

determining a number of first-look opportunities provided to each identified entity;

determining a first-look bind rate based on the ratio of first-look opportunities filled by each entity to first-look opportunities provided by that entity; and allocating a second-look opportunity to accept the conditional purchase offer to the identified entity having the highest first-look bind rate that was not previously provided an opportunity to accept the conditional purchase offer.

17. The method according to claim 16, further comprising:
identifying any hotels associated with the entity allocated the second-look opportunity that are capable of accepting the conditional purchase offer; and allocating an opportunity to accept the conditional purchase offer to one of the identified hotels associated with the second-look entity.

18. The method according to claim 17, wherein the opportunity to accept the conditional purchase offer is allocated to the identified second-look entity's hotel having the highest first-look bind rate.

19. The method according to claim 18, further comprising:
determining whether the second-look entity's hotel allocated an opportunity to accept the conditional purchase offer can accept the conditional purchase offer; and allocating an opportunity to accept the conditional purchase offer to one of the remaining identified second-look entity's hotels having the highest first-look bind rate that was not previously allocated an opportunity to accept the conditional purchase offer.

20. The method according to claim 19, further comprising:
determining whether any of the identified hotels associated with the second-look entity that were allocated can accept the conditional purchase offer;

ranking the remaining identified entities that have not been provided an opportunity to accept the conditional purchase offer in order of highest relevant market share; and allocating the next opportunity to accept the conditional purchase offer to the remaining entity having the highest relevant market share.

21. The method according to claim 20, further comprising:
- identifying any hotels associated with the entity allocated the next opportunity that are capable of accepting the conditional purchase offer; and
- allocating an opportunity to accept the conditional purchase offer to one of the identified hotels associated with that entity.

22. The method according to claim 21, wherein the opportunity to accept the conditional purchase offer is allocated to the identified hotel associated with the entity allocated the next opportunity to accept the conditional purchase offer having the highest relevant market share.

23. The method according to claim 22, further comprising:
- determining whether the hotel allocated an opportunity to accept the conditional purchase offer can accept the conditional purchase offer; and
- allocating an opportunity to accept the conditional purchase offer to one of the remaining identified hotels associated with the entity allocated the next opportunity to accept the conditional purchase offer having the highest relevant market share that was not previously allocated an opportunity to accept the conditional purchase offer.

24. The method according to claim 23, further comprising: allocating an opportunity to accept the conditional purchase offer to one of the identified entities not previously allocated an opportunity to satisfy the conditional purchase order.

25. A system for allocating a conditional purchase offer for a hotel reservation to one of a plurality of entities in a buyer-driven commerce system, comprising:
- an electronic storage device for storing information on entities and hotels capable of satisfying the conditional purchase offer; and
- a central controller for processing the conditional purchase offer for a hotel reservation in a specified relevant market area, the central controller in communication with the electronic storage device to identify at least one of the plurality of entities capable of satisfying the conditional purchase offer, wherein the central controller searches a database in the electronic storage device to identify hotel properties within the relevant market area that can satisfy the conditional purchase offer and the entity associated with each of the identified hotel properties;
- wherein the central controller searches a database stored in the electronic storage device to determine a relevant market share gap for each of the identified entities by subtracting a percentage of first-look opportunities previously provided to the entity in the relevant market area from that entity's market share percentage in the relevant market area and the central controller allocates the first-look opportunity to accept the conditional purchase offer to the identified entity having the largest negative relevant market share gap.

26. The system according to claim 25, wherein market share percentage is the ratio of the number of hotel rooms the entity has within the relevant market area to the total number of hotel rooms within the relevant market.

27. The system according to claim 25, wherein market share percentage is the ratio of hotels associated with the entity within the relevant market area to the total number of hotels within the relevant market.

28. The system according to claim 25, wherein the central controller allocates an opportunity to accept the conditional purchase offer to one of the identified hotels associated with the entity allocated the first-look opportunity.

29. The system according to claim 28, wherein the central controller allocates a first opportunity to satisfy the conditional purchase offer to the identified hotel assigned to the entity having the first-look opportunity that satisfies a predetermined metric.

30. The system according to claim 29, wherein the conditional purchase offer includes a minimum quality of service rating acceptable to the buyer and each identified hotel assigned to the entity having the first-look opportunity is grouped according to the quality of service rating assigned to the hotel.

31. The system according to claim 30, wherein the central controller selects at least one of the identified hotels associated with the first-look entity that satisfies the minimum quality of service rating specified in the conditional purchase offer, computes a relevant market share gap for each of the selected hotels by subtracting the percentage of first-look opportunities previously provided to the hotel in the relevant market area from that hotel's market share percentage in the relevant market area, and allocates the first opportunity to accept the conditional purchase offer to the selected hotel having the largest negative relevant market share gap.

32. The system according to claim 31, wherein the central controller binds the buyer to the conditional purchase offer if the hotel allocated the first opportunity accepts the conditional purchase offer.

33. The system according to claim 31, wherein the central controller allocates an opportunity to accept the conditional purchase offer to another of the selected hotels associated with the first-look entity if the hotel allocated the first opportunity does not accept the conditional purchase offer.

34. The system according to claim 33, wherein the central controller allocates an opportunity to accept the conditional purchase offer to the selected hotel associated with the first-look entity having the largest market share that was not previously allocated an opportunity to accept the conditional purchase offer.

35. The system according to claim 34, wherein the central controller allocates an opportunity to accept the conditional purchase offer to a remaining one of the selected hotels associated with the first-look entity having the largest market share that was not previously allocated an opportunity to accept the conditional purchase offer.

36. The system according to claim 35, wherein the central controller allocates a second-look opportunity to accept the conditional purchase offer to another of the identified entities if none of the hotels associated with the entity allocated the first-look opportunity can accept the conditional purchase offer.

37. The system according to claim 36, wherein the central controller determines a first-look bind rate based on the ratio of first-look opportunities filled by each entity to first-look opportunities provided by that entity and allocates a second-look opportunity to accept the conditional purchase offer to the identified entity having the highest first-look bind rate that was not previously provided an opportunity to accept the conditional purchase offer.

38. The system according to claim 37, wherein the central controller searches a database stored in the storage device to identify any hotels associated with the entity allocated the second-look opportunity that are capable of accepting the conditional purchase offer and allocates an opportunity to accept the conditional purchase offer to one of the identified hotels associated with the second-look entity.

39. The system according to claim 38, wherein the opportunity to accept the conditional purchase offer is allocated to the identified second-look entity's hotel having the highest first-look bind rate.

40. The system according to claim 39, wherein the central controller allocates an opportunity to accept the conditional purchase offer to one of the remaining identified second-look entity's hotels having the highest first-look bind rate that was not previously allocated an opportunity to accept the conditional purchase offer.

41. The system according to claim 40, wherein the central controller allocates the next opportunity to accept the conditional purchase offer to the remaining entity having the highest relevant market share.

42. The system according to claim 41, wherein the central controller searches a database stored in the storage device to identify any hotels associated with the entity allocated the next opportunity that are capable of accepting the conditional purchase offer and allocates an opportunity to accept the conditional purchase offer to one of the identified hotels associated with that entity.

43. The system according to claim 42, wherein the central controller allocates the opportunity to accept the conditional purchase offer to the identified hotel associated with the entity allocated the next opportunity to accept the conditional purchase offer having the highest relevant market share.

44. The system according to claim 43, wherein the central controller allocates an opportunity to accept the conditional purchase offer to one of the remaining identified hotels associated with the entity allocated the next opportunity to accept the conditional purchase offer having the highest relevant market share that was not previously allocated an opportunity to accept the conditional purchase offer.

45. A method of using a web server to allocate a conditional purchase offer for a hotel reservation to one of a plurality of entities in a buyer-driven system, comprising:
receiving on said web server the conditional purchase offer for a hotel reservation in a specified relevant market area from a buyer filling out at least one electronic form on a web page provided by the web server;
identifying at least one of the plurality of entities capable of satisfying the conditional purchase offer; wherein the identifying step comprises:
searching a database to identify hotel properties within the relevant market area that can satisfy the conditional purchase offer; and
for each identified hotel property, identifying the entity associated with the identified hotel property; and further comprising:
determining each identified entity's market share percentage in the relevant market area;
determining a percentage of first-look opportunities previously provided to each of the identified entities in the relevant market area;
determining a relevant market share gap for each of the identified entities by subtracting the percentage of first-look opportunities previously provided to the entity in the relevant market area from that entity's market share percentage in the relevant market area; and
allocating the first-look opportunity to accept the conditional purchase offer to the identified entity having the largest negative relevant market share gap.

46. The method according to claim 45, further comprising allocating an opportunity to accept the conditional purchase offer to one of the identified hotels associated with the entity allocated the first-look opportunity.

47. The method according to claim 46, further comprising:
ranking the identified hotels assigned to the entity having the first-look opportunity according to a predetermined metric; and
allocating a first opportunity to satisfy the conditional purchase offer to the identified hotel assigned to the entity having the first-look opportunity that satisfies the predetermined metric.

48. The method according to claim 47, wherein the conditional purchase offer includes a minimum quality of service rating acceptable to the buyer and each identified hotel assigned to the entity having the first-look opportunity is grouped according to the quality of service rating assigned to the hotel.

49. The method according to claim 48, further comprising:
selecting at least one of the identified hotels associated with the first-look entity that satisfies the minimum quality of service rating specified in the conditional purchase offer;
determining each selected hotel's market share percentage in the relevant market area;
determining a percentage of first-look opportunities previously provided to each of the selected hotels in the relevant market area;
determining a relevant market share gap for each of the selected hotels by subtracting the percentage of first-look opportunities previously provided to the hotel in the relevant market area from that hotel's market share percentage in the relevant market area; and
allocating the first opportunity to accept the conditional purchase offer to the selected hotel having the largest negative relevant market share gap.

50. The method according to claim 49, further comprising determining whether the hotel allocated the first opportunity can accept the conditional offer.

51. The method according to claim 50, further comprising binding the buyer to the conditional purchase offer if the hotel allocated the first opportunity accepts the conditional purchase offer.

52. The method according to claim 50, further comprising allocating an opportunity to accept the conditional purchase offer to another of the selected hotels associated with the first-look entity if the hotel allocated the first opportunity does not accept the conditional purchase offer.

53. The method according to claim 52, further comprising:
ranking the selected hotels associated with the first-look entity in order of market share in the relevant market area; and
allocating an opportunity to accept the conditional purchase offer to the selected hotel associated with the first-look entity having the largest market share that was not previously allocated an opportunity to accept the conditional purchase offer.

54. The method according to claim 53, further comprising:
determining whether the hotel allocated the opportunity can accept the conditional purchase offer; and
allocating an opportunity to accept the conditional purchase offer to a remaining one of the selected hotels associated with the first-look entity having the largest market share that was not previously allocated an opportunity to accept the conditional purchase offer.

55. The method according to claim 54, further comprising binding the buyer to the conditional purchase offer if the hotel allocated the opportunity accepts the conditional purchase offer.

56. The method according to claim 54, further comprising:
   selecting the identified hotels associated with the first-look entity that exceed the minimum quality of service rating specified in the conditional purchase offer and have not previously been provided an opportunity to satisfy the conditional purchase offer;
   determining a relevant market share for each of the selected hotels; and
   allocating an opportunity to accept the conditional purchase offer to the selected hotel having the largest relevant market share.

57. The method according to claim 56, further comprising allocating a second-look opportunity to accept the conditional purchase offer to another of the identified entities if none of the hotels associated with the entity allocated the first-look opportunity can accept the conditional purchase offer.

58. The method according to claim 57, further comprising:
   determining a number of first-look opportunities filled by each identified entity;
   determining a number of first-look opportunities provided to each identified entity;
   determining a first-look bind rate based on the ratio of first-look opportunities filled by each entity to first-look opportunities provided by that entity; and
   allocating a second-look opportunity to accept the conditional purchase offer to the identified entity having the highest first-look bind rate that was not previously provided an opportunity to accept the conditional purchase offer.

59. The method according to claim 58, further comprising:
   identifying any hotels associated with the entity allocated the second-look opportunity that are capable of accepting the conditional purchase offer; and
   allocating an opportunity to accept the conditional purchase offer to one of the identified hotels associated with the second-look entity.

60. The method according to claim 59, wherein the opportunity to accept the conditional purchase offer is allocated to the identified second-look entity's hotel having the highest first-look bind rate.

61. The method according to claim 60, further comprising:
   determining whether the second-look entity's hotel allocated an opportunity to accept the conditional purchase offer can accept the conditional purchase offer; and
   allocating an opportunity to accept the conditional purchase offer to one of the remaining identified second-look entity's hotels having the highest first-look bind rate that was not previously allocated an opportunity to accept the conditional purchase offer.

62. The method according to claim 61, further comprising:
   determining whether any of the identified hotels associated with the second-look entity that were allocated can accept the conditional purchase offer;
   ranking the remaining identified entities that have not been provided an opportunity to accept the conditional purchase offer in order of highest relevant market share; and
   allocating the next opportunity to accept the conditional purchase offer to the remaining entity having the highest relevant market share.

63. The method according to claim 62, further comprising:
   identifying any hotels associated with the entity allocated the next opportunity that are capable of accepting the conditional purchase offer; and
   allocating an opportunity to accept the conditional purchase offer to one of the identified hotels associated with that entity.

64. The method according to claim 63, wherein the opportunity to accept the conditional purchase offer is allocated to the identified hotel associated with the entity allocated the next opportunity to accept the conditional purchase offer having the highest relevant market share.

65. The method according to claim 64, further comprising:
   determining whether the hotel allocated an opportunity to accept the conditional purchase offer can accept the conditional purchase offer; and
   allocating an opportunity to accept the conditional purchase offer to one of the remaining identified hotels associated with the entity allocated the next opportunity to accept the conditional purchase offer having the highest relevant market share that was not previously allocated an opportunity to accept the conditional purchase offer.

66. The method according to claim 65, further comprising: allocating an opportunity to accept the conditional purchase offer to one of the identified entities not previously allocated an opportunity to satisfy the conditional purchase order.

67. A system for allocating a conditional purchase offer for a hotel reservation to one of a plurality of entities in a buyer-driven commerce system, comprising:
   a web server providing a web page accessible by a buyer;
   a storage device for storing information on entities and hotels capable of satisfying the conditional purchase offer; and
   a computer processor for receiving the conditional purchase offer from the buyer utilizing a web browser to access the web page and for processing the conditional purchase offer for a hotel reservation in a specified relevant market area, the processor in communication with the storage device to identify at least one of the plurality of entities capable of satisfying the conditional purchase offer, wherein the processor searches a database in the storage device to identify hotel properties within the relevant market area that can satisfy the conditional purchase offer and the entity associated with each of the identified hotel properties;
   wherein the processor searches a database stored in the storage device to determine a relevant market share gap for each of the identified entities by subtracting the percentage of first-look opportunities previously provided to the entity in the relevant market area from that entity's market share percentage in the relevant market area and the processor allocates the first-look opportunity to accept the conditional purchase offer to the identified entity having the largest negative relevant market share gap.

68. The system according to claim 67, wherein the processor allocates an opportunity to accept the conditional purchase offer to one of the identified hotels associated with the entity allocated the first-look opportunity.

69. The system according to claim 68, wherein the processor allocates a first opportunity to satisfy the conditional purchase offer to the identified hotel assigned to the entity having the first-look opportunity that satisfies a predetermined metric.

70. The system according to claim 69, wherein the conditional purchase offer includes a minimum quality of service rating acceptable to the buyer and each identified hotel assigned to the entity having the first-look opportunity is grouped according to the quality of service rating assigned to the hotel.

71. The system according to claim 70, wherein the processor selects at least one of the identified hotels associated with the first-look entity that satisfies the minimum quality of service rating specified in the conditional purchase offer, computes a relevant market share gap for each of the selected hotels by subtracting the percentage of first-look opportunities previously provided to the hotel in the relevant market area from that hotel's market share percentage in the relevant market area, and allocates the first opportunity to accept the conditional purchase offer to the selected hotel having the largest negative relevant market share gap.

72. The system according to claim 71, wherein the processor binds the buyer to the conditional purchase offer if the hotel allocated the first opportunity accepts the conditional purchase offer.

73. The system according to claim 71, wherein the processor allocates an opportunity to accept the conditional purchase offer to another of the selected hotels associated with the first-look entity if the hotel allocated the first opportunity does not accept the conditional purchase offer.

74. The system according to claim 73, wherein the processor allocates an opportunity to accept the conditional purchase offer to the selected hotel associated with the first-look entity having the largest market share that was not previously allocated an opportunity to accept the conditional purchase offer.

75. The system according to claim 74, wherein the processor allocates an opportunity to accept the conditional purchase offer to a remaining one of the selected hotels associated with the first-look entity having the largest market share that was not previously allocated an opportunity to accept the conditional purchase offer.

76. The system according to claim 75, wherein the processor allocates a second-look opportunity to accept the conditional purchase offer to another of the identified entities if none of the hotels associated with the entity allocated the first-look opportunity can accept the conditional purchase offer.

77. The system according to claim 76, wherein the processor searches a database stored in the storage device to identify any hotels associated with the entity allocated the second-look opportunity that are capable of accepting the conditional purchase offer and allocates an opportunity to accept the conditional purchase offer to one of the identified hotels associated with the second-look entity.

78. The system according to claim 77, wherein the opportunity to accept the conditional purchase offer is allocated to the identified second-look entity's hotel having the highest first-look bind rate.

\* \* \* \* \*

UNITED STATES PATENT AND TRADEMARK OFFICE
CERTIFICATE OF CORRECTION

| | | |
|---|---|---|
| PATENT NO. | : 6,993,503 B1 | |
| APPLICATION NO. | : 09/560091 | |
| DATED | : January 31, 2006 | |
| INVENTOR(S) | : Peter James Heissenbuttel et al. | |

It is certified that error appears in the above-identified patent and that said Letters Patent is hereby corrected as shown below:

On Title Page, Col. 2

Item (56)    References Cited

OTHER PUBLICATIONS

Please add - - Hitch a Flight to Europe, select pages downloaded from www.travelassist.com on May 6, 1997 - -

Signed and Sealed this

Twenty-second Day of August, 2006

JON W. DUDAS
*Director of the United States Patent and Trademark Office*